(12) United States Patent
Mehr et al.

(10) Patent No.: US 12,547,152 B2
(45) Date of Patent: *Feb. 10, 2026

(54) PREDICTING PROCESS CONTROL PARAMETERS FOR FABRICATING AN OBJECT USING DEPOSITION

(71) Applicant: Relativity Space, Inc., Long Beach, CA (US)

(72) Inventors: Edward Mehr, Long Beach, CA (US); Tim Ellis, Long Beach, CA (US); Jordan Noone, Long Beach, CA (US)

(73) Assignee: Relativity Space, Inc., Long Beach, CA (US)

( * ) Notice: Subject to any disclaimer, the term of this patent is extended or adjusted under 35 U.S.C. 154(b) by 224 days.

This patent is subject to a terminal disclaimer.

(21) Appl. No.: 18/502,964

(22) Filed: Nov. 6, 2023

(65) Prior Publication Data

US 2024/0142941 A1 May 2, 2024

Related U.S. Application Data

(63) Continuation of application No. 17/176,557, filed on Feb. 16, 2021, now abandoned, which is a
(Continued)

(51) Int. Cl.
*G05B 19/4099* (2006.01)
*B22F 10/00* (2021.01)
(Continued)

(52) U.S. Cl.
CPC .......... *G05B 19/4099* (2013.01); *B22F 10/00* (2021.01); *B22F 10/12* (2021.01);
(Continued)

(58) Field of Classification Search
None
See application file for complete search history.

(56) References Cited

U.S. PATENT DOCUMENTS

| 5,394,509 A | 2/1995 | Winston |
|---|---|---|
| 2007/0205184 A1 | 9/2007 | Mazumder et al. |

(Continued)

FOREIGN PATENT DOCUMENTS

| CA | 3064593 A1 | 11/2018 |
|---|---|---|
| CA | 3064593 C | 5/2022 |

(Continued)

OTHER PUBLICATIONS

Extended European Search Report for European Application No. 18806932.2, Search completed Sep. 24, 2020, Mailed Feb. 5, 2021, 14 Pgs.

(Continued)

*Primary Examiner* — Mohammad Ali
*Assistant Examiner* — Saad M Kabir
(74) *Attorney, Agent, or Firm* — KPPB LLP

(57) ABSTRACT

Process control parameters are predicted to fabricate an object using deposition. An input design geometry is provided for the object. A training data set includes past post-build physical inspection data for a plurality of objects that comprise at least one object that is different from the object to be physically fabricated; and training data generated through a repetitive process of randomly choosing values for each of multiple process control parameters and scoring adjustments to the multiple process control parameters as leading to either undesirable or desirable outcomes, the outcomes based respectively on the presence or absence of defects detected in a fabricated object arising from the process control parameter adjustments. A machine learning algorithm is trained using the provided training data set and a predicted optimal set of the multiple process control parameters is generated for initiating and performing the deposition process to fabricate the object.

21 Claims, 17 Drawing Sheets

Related U.S. Application Data continuation of application No. 16/696,720, filed on Nov. 26, 2019, now Pat. No. 10,921,782, which is a continuation of application No. 16/234,325, filed on Dec. 27, 2018, now Pat. No. 10,539,952, which is a continuation of application No. 15/604,473, filed on May 24, 2017, now Pat. No. 10,234,848.

(51) Int. Cl.
| | |
|---|---|
| *B22F 10/12* | (2021.01) |
| *B22F 10/18* | (2021.01) |
| *B22F 10/25* | (2021.01) |
| *B22F 10/28* | (2021.01) |
| *B22F 10/38* | (2021.01) |
| *B22F 10/80* | (2021.01) |
| *B22F 10/85* | (2021.01) |
| *B22F 12/90* | (2021.01) |
| *B33Y 50/02* | (2015.01) |
| *G06N 3/045* | (2023.01) |
| *G06N 3/08* | (2023.01) |
| *G06N 7/02* | (2006.01) |
| *G06N 20/00* | (2019.01) |
| *G06N 20/10* | (2019.01) |
| *G06N 3/084* | (2023.01) |
| *G06N 5/01* | (2023.01) |
| *G06N 7/01* | (2023.01) |

(52) U.S. Cl.
CPC .............. *B22F 10/18* (2021.01); *B22F 10/25* (2021.01); *B22F 10/28* (2021.01); *B22F 10/38* (2021.01); *B22F 10/80* (2021.01); *B22F 10/85* (2021.01); *B22F 12/90* (2021.01); *B33Y 50/02* (2014.12); *G06N 3/045* (2023.01); *G06N 3/08* (2013.01); *G06N 7/02* (2013.01); *G06N 20/00* (2019.01); *G06N 20/10* (2019.01); *G05B 2219/35134* (2013.01); *G05B 2219/45165* (2013.01); *G05B 2219/49011* (2013.01); *G05B 2219/49017* (2013.01); *G05B 2219/49018* (2013.01); *G05B 2219/49023* (2013.01); *G06N 3/084* (2013.01); *G06N 5/01* (2023.01); *G06N 7/01* (2023.01)

(56) References Cited

U.S. PATENT DOCUMENTS

| | | |
|---|---|---|
| 2011/0103656 A1 | 5/2011 | Iordanescu et al. |
| 2014/0156576 A1 | 6/2014 | Nugent |
| 2015/0001196 A1 | 1/2015 | Kim et al. |
| 2018/0104742 A1 | 4/2018 | Kottilingam et al. |
| 2021/0191363 A1 | 6/2021 | Mehr et al. |

FOREIGN PATENT DOCUMENTS

| | | |
|---|---|---|
| EP | 3635640 A1 | 4/2020 |
| EP | 3635640 B1 | 7/2023 |
| EP | 4306241 A1 | 1/2024 |
| IN | 562336 | 3/2025 |
| JP | 2016553925 A | 11/2016 |
| JP | 2016537716 A | 12/2016 |
| JP | 6741883 B1 | 8/2020 |
| JP | 2020527475 A | 9/2020 |
| JP | 2021008113 A | 1/2021 |
| JP | 7084964 B2 | 6/2022 |
| NZ | 760534 A | 8/2020 |
| RU | 2722525 C1 | 6/2020 |
| WO | 2015015554 A1 | 2/2015 |
| WO | 2018217903 A1 | 11/2018 |

OTHER PUBLICATIONS

Extended European Search Report for European Application No. 23184602.3, Search completed Dec. 5, 2023, Mailed Dec. 14, 2023 10 Pgs.
International Preliminary Report on Patentability for International Application PCT/US2018/034147, Report issued Nov. 26, 2019, Mailed on Dec. 5, 2019, 13 Pgs.
Supplementary Partial European Search Report for European Application No. 18806932.2, Search completed Sep. 24, 2020, Mailed Sep. 30, 2020, 14 pgs.
Wu et al., "Detecting Cyber-Physical Attacks in Cyber Manufacturing Systems with Machine Learning Methods", Journal of Intelligent Manufacturing, Springer US, New York, Feb. 23, 2017, vol. 30, No. 3, pp. 1111-1123, XP036942318, ISSN: 0956-5515, DOI: Technical Fields. 10.1007/810845-017-1315-5.

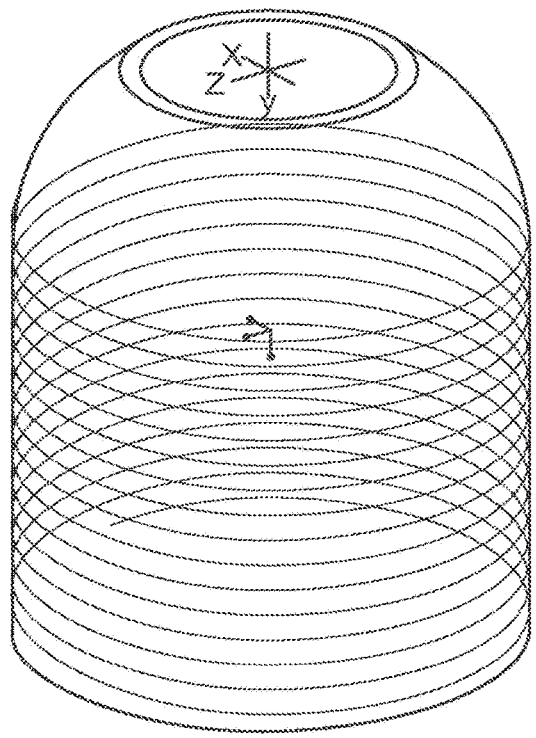 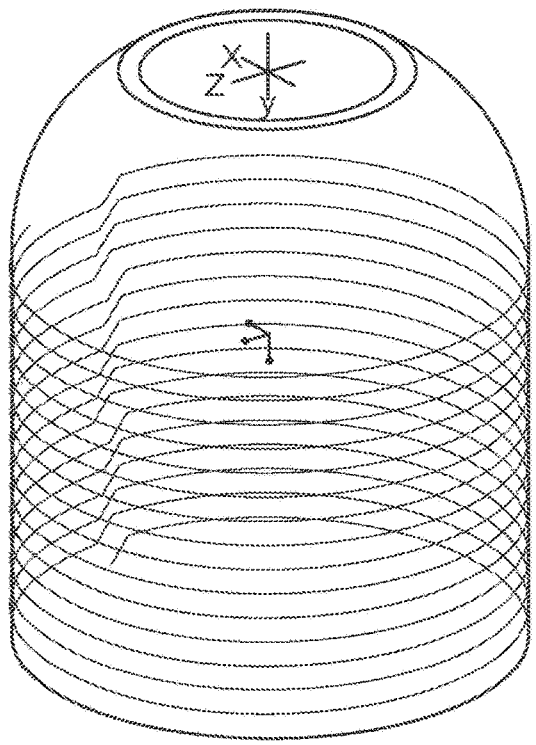
FIG. 3A　　　　　　　　　FIG. 3B
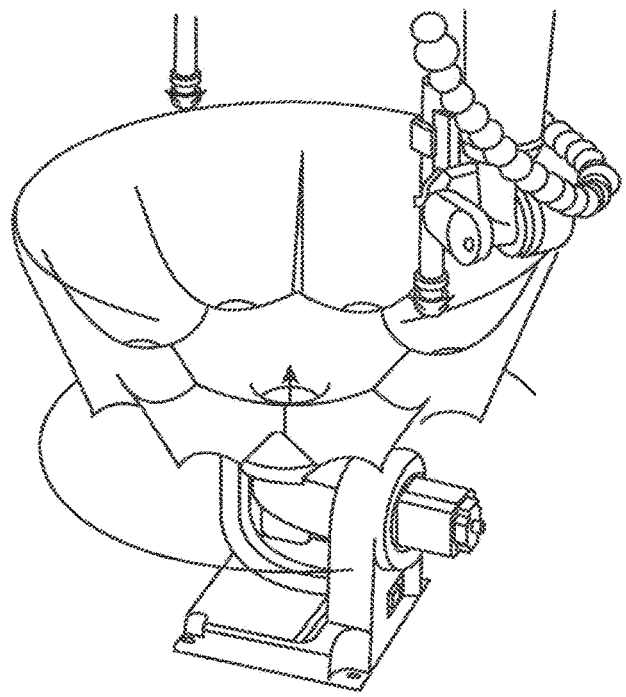
FIG. 3C

PREDICTING PROCESS CONTROL PARAMETERS FOR FABRICATING AN OBJECT USING DEPOSITION

CROSS-REFERENCE TO RELATED APPLICATIONS

This application is a continuation of application Ser. No. 17/176,557, filed on Feb. 16, 2021, which is a continuation of application Ser. No. 16/696,720, filed on Nov. 26, 2019, now U.S. Pat. No. 10,921,782, which is a continuation of application Ser. No. 16/234,325, filed on Dec. 27, 2018, now U.S. Pat. No. 10,539,952, which is a continuation of application Ser. No. 15/604,473, filed on May 24, 2017, now U.S. Pat. No. 10,234,848.

BACKGROUND OF THE INVENTION

Additive manufacturing processes are fabrication techniques that allow one to produce functional complex parts layer by layer, without the use of molds or dies. Despite recent advances in the methods and apparatus used for various types of additive manufacturing, a need exists for methods that allow rapid optimization and adjustment of the process control parameters used in response to changes in process or environmental parameters, as well as for improving the quality of the parts that are produced. Methods and systems are disclosed for performing automated classification of object defects using machine learning algorithms. Also disclosed are methods and systems for performing real-time adaptive control of free form deposition or joining processes, including additive manufacturing or welding processes, to improve process yield, throughput, and quality.

SUMMARY

Disclosed herein are methods for real-time adaptive control of a free form deposition process or a joining process, the methods comprising: a) providing an input design geometry for an object; b) providing a training data set, wherein the training data set comprises process simulation data, process characterization data, in-process inspection data, post-build inspection data, or any combination thereof, for a plurality of design geometries or portions thereof that are the same as or different from the input design geometry of step (a); c) providing a predicted optimal set or sequence of one or more process control parameters for fabricating the object, wherein the predicted optimal set of one or more process control parameters are derived using a machine learning algorithm that has been trained using the training data set of step (b); and d) performing the free form deposition process or the joining process to fabricate the object, wherein real-time process characterization data is provided as input to the machine learning algorithm to adjust one or more process control parameters in real-time.

In some embodiments, steps (b)-(d) are performed iteratively and process characterization data, in-process inspection data, post-build inspection data, or any combination thereof for each iteration is incorporated into the training data set. In some embodiments, the free form deposition process or joining process is a stereolithography (SLA), digital light processing (DLP), fused deposition modeling (FDM), selective laser sintering (SLS), selective laser melting (SLM), or electron beam melting (EBM), or welding process. In some embodiments, the free form deposition process is a liquid-to-solid free form deposition process. In some embodiments, the liquid-to-solid free form deposition process is a laser metal-wire deposition process. In some embodiments, the process simulation data is provided by performing finite element analysis (FEA), finite volume analysis (FVA), finite difference analysis (FDA), computational fluid dynamics (CFD) calculations, or any combination thereof. In some embodiments, the one or more process control parameters to be predicted or controlled comprise a rate of material deposition, a rate of displacement for a deposition apparatus, a rate of acceleration for a deposition apparatus, a direction of displacement for a deposition apparatus, a location of a deposition apparatus as a function of time (a tool path), an angle of a deposition apparatus with respect to a deposition direction, an angle of overhang in an intended geometry, an intensity of heat flux into a material during deposition, a size and shape of a heat flux surface, a flow rate and angle of shielding gas flow, a temperature of a baseplate, an ambient temperature control during a deposition process, a temperature of a deposition material prior to deposition, a current or voltage setting in a resistive heating apparatus, a voltage frequency or amplitude in an inductive heating apparatus, a choice of deposition material, a ratio by volume or a ratio by weight of deposition materials if more than one deposition material is used, or any combination thereof. In some embodiments, the process simulation data comprises a prediction of a bulk or peak temperature of a deposited material, a cooling rate of a deposited material, a chemical composition of a deposited material, a segregation state of constituents in a deposited material, a geometrical property of a deposited material, an intensity of heat flux out of a material during deposition, an electromagnetic emission from a deposition material, an acoustic emission from a deposition material, or any combination thereof, as a function of a set of specified input process control parameters. In some embodiments, the process characterization data comprises a measurement of a bulk or peak temperature of a deposited material, a cooling rate of a deposited material, a chemical composition of a deposited material, a segregation state of constituents in a deposited material, a geometrical property of a deposited material, a rate of material deposition, a rate of displacement for a deposition apparatus, a location (tool path) of a deposition apparatus, an angle of a deposition apparatus with respect to a deposition direction, a deposition apparatus status indicator, an angle of overhang in a deposited geometry, an angle of overhang in an intended geometry, an intensity of heat flux into a material during deposition, an intensity of heat flux out of a material during deposition, an electromagnetic emission from a deposition material, an acoustic emission from a deposition material, an electrical conductivity of a deposition material, a thermal conductivity of a deposition material, a defect in the geometry of an object being fabricated, or any combination thereof. In some embodiments, the in-process or post-build inspection data comprises data from a visual or machine vision-based inspection of surface finish, a visual or machine vision-based inspection of surface cracks and pores, a test of a mechanical property such as strength, hardness, ductility, fatigue, a test of a chemical property such as composition, segregation of constituent materials, a defect characterization methodology such as X-ray diffraction or imaging, CT scanning, ultrasonic imaging, Eddy current sensor array measurements, or thermography, or any combination thereof. In some embodiments, the machine learning algorithm comprises a supervised learning algorithm, an unsupervised learning algorithm, a semi-supervised learning algorithm, a reinforcement learning algorithm, a deep learning algorithm, or any combination thereof. In some embodiments, the machine learning algorithm comprises an artificial neural network algorithm, a Gaussian process regression algorithm, a logistical model tree algorithm, a random forest algorithm, a fuzzy classifier algorithm, a decision tree algorithm, a hierarchical clustering algorithm, a k-means algorithm, a fuzzy clustering algorithm, a deep Boltzmann machine learning algorithm, a deep convolutional neural network algorithm, a deep recurrent neural network, or any combination thereof. In some embodiments, the machine learning algorithm comprises an artificial neural network. In some embodiments, the artificial neural network comprises an input layer, an output layer, and at least 1 hidden layer. In some embodiments, the artificial neural network comprises an input layer, an output layer, and at least 5 hidden layers. In some embodiments, the artificial neural network comprises an input layer, an output layer, and at least 10 hidden layers. In some embodiments, the number of nodes in the input layer is at least 10. In some embodiments, the number of nodes in the input layer is at least 100. In some embodiments, the number of nodes in the input layer is at least 1,000. In some embodiments, at least one stream of process characterization data is provided to the machine learning algorithm at a rate of at least 10 Hz. In some embodiments, at least one stream of process characterization data is provided to the machine learning algorithm at a rate of at least 100 Hz. In some embodiments, at least one stream of process characterization data is provided to the machine learning algorithm at a rate of at least 1,000 Hz. In some embodiments, the one or more process control parameters are adjusted at a rate of at least 10 Hz. In some embodiments, the one or more process control parameters are adjusted at a rate of at least 100 Hz. In some embodiments, the one or more process control parameters are adjusted at a rate of at least 1,000 Hz. In some embodiments, the method is implemented using a single integrated system comprising a deposition apparatus, a sensor, and a processor. In some embodiments, the method is implemented using a distributed, modular system comprising a first deposition apparatus, a first sensor, and a first processor, wherein the first deposition apparatus, the first sensor, and the first processor are configured to share training data and/or real-time process characterization data via a local area network (LAN), an intranet, an extranet, or an internet. In some embodiments, the training data set resides in the internet cloud. In some embodiments, the sharing of data between the first deposition apparatus, the first sensor, and the first processor is facilitated by use of a data compression algorithm, a data feature extraction algorithm, or a data dimensionality reduction algorithm. In some embodiments, the training data set is shared between and updated using data from a plurality of deposition apparatus and sensors that are configured to share data via a local area network (LAN), an intranet, an extranet, or an internet. In some embodiments, the training data set further comprises process characterization data, in-process inspection data, post-build inspection data, or any combination thereof, that is generated by a skilled operator while manually adjusting the input process control parameters. In some embodiments, as part of the training of the machine learning algorithm, the machine learning algorithm randomly chooses values within a specified range for each of a set of one or more process control parameters, and incorporates the resulting process simulation data, process characterization data, in-process inspection data, post-build inspection data, or any combination thereof, into the training data set to improve a learned model that maps process control parameter values to process outcomes.

Also disclosed herein are systems for controlling a free form deposition process or a joining process, the systems comprising: a) a first deposition apparatus, wherein the deposition apparatus is capable of fabricating an object based on an input design geometry; b) one or more process characterization sensors, wherein the one or more process characterization sensors provide real-time data for one or more process parameters or object properties; and c) a processor programmed to (i) provide a predicted optimal set of one or more input process control parameters, and (ii) to adjust one or more process control parameters in real-time based on a stream of real-time process characterization data provided by the one or more process characterization sensors, wherein the predictions and adjustments are derived using a machine learning algorithm that has been trained using a training data set.

In some embodiments, the system further comprises a computer memory device within which machine learning algorithm software, sensor data from the one or more process characterization sensors, predicted or adjusted values of one or more process control parameters, the training data set, or any combination thereof, is stored. In some embodiments, the first deposition apparatus, the one or more process characterization sensors, and the processor are incorporated into a single integrated system. In some embodiments, the first deposition apparatus, the one or more process characterization sensors, and the processor are configured as distributed system modules that share training data and/or real-time process characterization data via a local area network (LAN), an intranet, an extranet, or an internet. In some embodiments, the training data set resides in the internet cloud, and is shared between and updated using data from a plurality of deposition apparatus and sensors that are configured to share data via a local area network (LAN), an intranet, an extranet, or an internet. In some embodiments, the training data set comprises process simulation data, process characterization data, in-process inspection data, post-build inspection data, or any combination thereof, for a plurality of objects that are the same as or different from the object of step (a). In some embodiments, the one or more process characterization sensors comprise temperature sensors, position sensors, motion sensors, touch/proximity sensors, accelerometers, profilometers, goniometers, image sensors and machine vision systems, electrical conductivity sensors, thermal conductivity sensors, strain gauges, durometers, X-ray diffraction or imaging devices, CT scanning devices, ultrasonic imaging devices, Eddy current sensor arrays, thermographs, deposition apparatus status indicators, or any combination thereof. In some embodiments, the one or more process characterization sensors comprise at least one laser interferometer, machine vision system, or sensor that detects electromagnetic radiation that is reflected, scattered, absorbed, transmitted, or emitted by the object. In some embodiments, the machine vision system is configured as a visible light-based system used for measurement of object dimensions. In some embodiments, the machine vision system is configured as a visible light-based system used for measurement of object surface finish. In some embodiments, the machine vision system is configured as an infrared-based system used for measurement of object temperature or heat flux within the object. In some embodiments, the machine vision system is configured as an X-ray diffraction-based system used for measurement of object material properties. In some embodiments, the one or more process control parameters to be predicted or adjusted comprise a rate of material deposition, a rate of displacement for a deposition apparatus, a rate of acceleration for a deposition apparatus, a direction of displacement for a deposition apparatus, an angle of a deposition apparatus with respect to a deposition direction, an intensity of heat flux into a material during deposition, a size and shape of a heat flux surface, a flow rate and angle of shielding gas flow, a temperature of a deposition apparatus, an ambient temperature control during a deposition process, a temperature of a deposition material prior to deposition, a current or voltage setting in a resistive heating apparatus, a voltage frequency or amplitude in an inductive heating apparatus, a choice of deposition material, a ratio by volume or a ratio by weight of deposition materials if more than one deposition material is used, or any combination thereof. In some embodiments, the machine learning algorithm comprises a supervised learning algorithm, an unsupervised learning algorithm, a semi-supervised learning algorithm, a reinforcement learning algorithm, a deep learning algorithm, or any combination thereof. In some embodiments, the machine learning algorithm comprises an artificial neural network. In some embodiments, the artificial neural network comprises an input layer, an output layer, and at least 5 hidden layers. In some embodiments, the number of nodes in the input layer is at least 100. In some embodiments, at least one stream of real-time process characterization data is provided to the machine learning algorithm at a rate of at least 100 Hz. In some embodiments, the one or more process control parameters are adjusted at a rate of at least 100 Hz.

Disclosed herein are methods for automated classification of object defects, the methods comprising: a) providing a training data set, wherein the training data set comprises fabrication process simulation data, fabrication process characterization data, in-process inspection data, post-build inspection data, or any combination thereof, for a plurality of design geometries that are the same as or different from that of the object; b) providing one or more sensors, wherein the one or more sensors provide real-time data for one or more object properties; c) providing a processor programmed to provide a classification of detected object defects using a machine learning algorithm that has been trained using the training data set of step (a), wherein the real-time data from the one or more sensors is provided as input to the machine learning algorithm and allows the classification of detected object defects to be adjusted in real-time.

In some embodiments, the method further comprises removing noise from the object property data provided by the one or more sensors prior to providing it to the machine learning algorithm. In some embodiments, noise is removed from the object property data using a signal averaging algorithm, smoothing filter algorithm, Kalman filter algorithm, nonlinear filter algorithm, total variation minimization algorithm, or any combination thereof. In some embodiments, the one or more sensors provide data on electromagnetic radiation that is reflected, scattered, absorbed, transmitted, or emitted by the object. In some embodiments, the one or more sensors comprise image sensors or machine vision systems. In some embodiments, the electromagnetic radiation is ultraviolet, visible, or infrared light. In some embodiments, the one or more sensors provide data on acoustic energy or mechanical energy that is reflected, scattered, absorbed, transmitted, or emitted by the object. In some embodiments, subtraction of a reference data set is used to increase contrast between normal and defective features of the object. In some embodiments, the one or more sensors provide data on an electrical conductivity or a thermal conductivity of the object. In some embodiments, the machine learning algorithm comprises a supervised learning algorithm, an unsupervised learning algorithm, a semi-supervised learning algorithm, a reinforcement learning algorithm, a deep learning algorithm, or any combination thereof. In some embodiments, at least one of the one or more sensors provide data as input to the machine learning algorithm at a rate of at least 100 Hz. In some embodiments, the classification of detected object defects is adjusted at a rate of at least 100 Hz. In some embodiments, the object defects that are detected are classified using a support vector machine (SVM), artificial neural network (ANN), or decision tree-based expert learning system. In some embodiments, the object defects are detected as differences between object property data and a reference data set that are larger than a specified threshold, and are classified using a one-class support vector machine (SVM) or autoencoder algorithm. In some embodiments, the object defects are detected and classified using an unsupervised one-class support vector machine (SVM), autoencoder, clustering, or nearest neighbor (kNN) machine learning algorithm and a training data set that comprises object property data for defective and defect-free objects.

Disclosed herein are methods for real-time adaptive control of a free form deposition process or a joining process, the methods comprising: a) providing an input design geometry for an object; b) providing a training data set, wherein the training data set comprises process simulation data, process characterization data, in-process inspection data, post-build inspection data, or any combination thereof, for a plurality of design geometries or portions thereof that are the same as or different from the input design geometry of step (a); c) providing a set or sequence of one or more process control parameters for initiating the free form deposition process or joining process to fabricate the object; and d) performing the free form deposition process or the joining process to fabricate the object, wherein real-time process characterization data is provided as input to a machine learning algorithm that has been trained using the training data set of step (b) to adjust the one or more process control parameters in real-time. In some embodiments, the predicted optimal set or sequence of one or more process control parameters for initiating the free form deposition process or the joining process is also derived using the machine learning algorithm.

INCORPORATION BY REFERENCE

All publications, patents, and patent applications mentioned in this specification are herein incorporated by reference in their entirety to the same extent as if each individual publication, patent, or patent application was specifically and individually indicated to be incorporated by reference in its entirety. In the event of a conflict between a term herein and a term in an incorporated reference, the term herein controls.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIGS. 3A-C provide schematic illustrations of the conversion of a CAD design for a three-dimensional object to a continuous, spiral wound "two-dimensional" layer (of finite thickness) and associated helical tool path (FIG. 3A), or a stacked series of "two-dimensional" layers and associated circular, layer-by-layer tool paths (FIG. 3B) for deposition of material using an additive manufacturing process. FIG. 3C: illustration of the tool path for a robotically manipulated deposition tool and simulation of the resulting object fabricated using an additive manufacturing process.

FIG. 4A: isometric view of color-encoded three-dimensional FEA simulation data for the liquid fraction of material in the melt pool being deposited by a laser-metal wire deposition process. FIG. 4B: cross-sectional view of the FEA simulation data for the liquid fraction of material in the melt pool. FIG. 4C: cross-sectional view of color-encoded three-dimensional FEA simulation data for the static temperature of the material in the melt pool.

FIG. 6A: schematic illustration of laser beams used to probe the geometry of the wire feed and melt pool overlaid with a photo of a laser-metal wire deposition process. FIG. 6B: cross-sectional profiles (i.e., height profiles across the width of the deposition) of the wire feed (solid line; peak) and previously deposited layer (solid line; shoulders) and resulting melt pool (dashed line). The x-axis (width) dimension is plotted in arbitrary units. The y-axis (height) dimension is plotted in units of millimeters relative to a fixed reference point below the deposition layer.

FIG. 7A: raw image stream obtained from machine vision system. FIG. 7B: processed image after de-noising, filtering, and edge detection algorithms have been applied. FIG. 7C: processed image after application of a feature extraction algorithm.

FIG. 16A: image of part after build process has been completed. FIG. 16B: post-build inspection output (CT scan). FIG. 16C: the CT scan image of FIG. 16B after automated feature extraction; automated feature extraction allows one to correlate part features with build-time actions.

DETAILED DESCRIPTION

Disclosed herein are methods for automated classification of object defects, for example, for objects fabricated using an additive manufacturing process or welding process, where the methods comprise: a) providing a training data set, wherein the training data set comprises fabrication process simulation data, fabrication process characterization data, in-process inspection data, post-build inspection data, or any combination thereof, for a plurality of object design geometries that are the same as or different from the object; b) providing one or more sensors, wherein the one or more sensors provide real-time data for one or more object properties; c) providing a processor programmed to provide a classification of detected object defects using a machine learning algorithm that has been trained using the training data set of step (a), wherein the real-time data from the one or more sensors is provided as input to the machine learning algorithm and allows the classification of detected object defects to be adjusted in real-time. Also disclosed are systems designed to perform automated classification of object defects.

Figure 1:
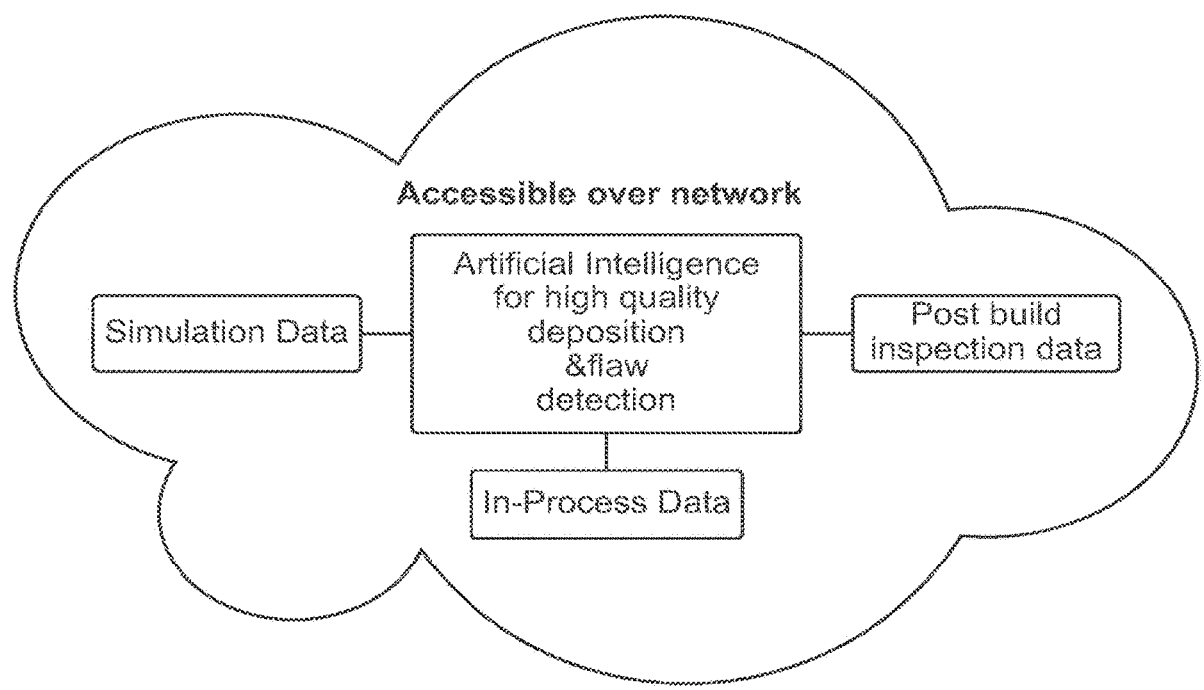
FIG. 1 provides a schematic illustration of a machine learning-based system for providing real-time adaptive control of free form deposition processes, e.g., additive manufacturing processes.

Disclosed herein are methods for real-time adaptive control of an additive manufacturing or welding process comprising: a) providing an input design geometry for an object; b) providing a training data set, wherein the training data set comprises process simulation data, process characterization data, in-process inspection data, post-build inspection data, or any combination thereof, for a plurality of design geometries that are the same as or different from the input design geometry of step (a) or any portion thereof; c) providing a predicted optimal set/sequence of one or more process control parameters for fabricating the object, wherein the predicted optimal set of one or more process control parameters are derived using a machine learning algorithm that has been trained using the training data set of step (b); and d) performing the additive manufacturing or welding process to fabricate the object, wherein real-time process characterization data is provided as input to the machine learning algorithm to adjust one or more process control parameters in real-time. Also disclosed are systems designed to implement these methods, as illustrated schematically in FIG. 1. As indicated in FIG. 1, in some embodiments, the disclosed methods for adaptive, real-time control of additive manufacturing or welding processes may be implemented using a distributed system, e.g., where different components or modules of the system are physically located in different workspaces, at different work sites, or in different geographical locations, and process simulation data, process characterization data, in-process inspection data, post-build inspection data, and/or adaptive process control instructions are shared and exchanged between locations by means of a telecommunications network or the internet.

In some embodiments, process simulation data may be incorporated into the training data set used by the machine learning algorithm that enables automated classification of object defects, prediction of optimal sets or sequences of process control parameters, adjustment of process control parameters in real-time, or any combination thereof. For example, process simulation tools such as finite element analysis (FEA) may be used to simulate the process for fabricating an object or a specific portion thereof, e.g., a feature, from any of a variety of fabrication materials as a function of a specified set of process control parameters. In some embodiments, process simulation tools may be used to predict an optimal set or sequence of process control parameters for fabricating a specified object or object feature.

In some embodiments, process characterization data may be incorporated into the training data set used by the machine learning algorithm that enables automated classification of object defects, prediction of optimal sets or sequences of process control parameters, adjustment of process control parameters in real-time, or any combination thereof. For example, process characterization data may be provided by any of a variety of sensors or machine vision systems, as will be described in more detail below. In some embodiments, process characterization data may be fed to the machine learning algorithm in order to update the process control parameters of an additive manufacturing apparatus in real-time.

In some embodiments, in-process or post-build inspection data may be incorporated into the training data set used by the machine learning algorithm that enables automated classification of object defects, prediction of optimal sets or sequences of process control parameters, adjustment of process control parameters in real-time, or any combination thereof. For example, in-process or post-build inspection data may include data from visual or machine vision-based measurements of object dimensions, surface finish, number of surface cracks or pores, etc., as will be described in more detail below. In some embodiments, in-process inspection data (e.g., automated defect classification data) may be used by the machine learning algorithm to determine a set or sequence of process control parameter adjustments that will implement a corrective action, e.g., to adjust a layer dimension or thickness, so as to correct the defect when first detected. In some embodiments, in-process inspection data (e.g., automated defect classification data) may be used by the machine learning algorithm to send a warning or error signal to an operator, or optionally, to automatically abort the deposition process, e.g., an additive manufacturing process.

In some embodiments, the training data set is updated with additional process simulation data, process characterization data, in-process inspection data, post-build inspection data, or any combination thereof, after each iteration of an additive manufacturing process that is performed iteratively. In some embodiments, the training data set further comprises process characterization data, in-process inspection data, post-build inspection data, or any combination thereof, that is generated by a skilled operator while manually setting the input process control parameters for an additive manufacturing process to produce a specified set of objects or parts, or while manually adjusting the process control parameters in response to changes in process parameters or environmental variables to maintain a specified quality of the objects or parts being produced. In some embodiments, the training data set may comprise process simulation data, process characterization data, in-process inspection data, post-build inspection data, or any combination thereof that is collected from a plurality of additive manufacturing apparatus operating serially or in parallel.

A variety of different machine learning algorithms known to those of skill in the art may be employed to implement the disclosed methods for automated object defect classification and adaptive control of additive manufacturing or welding processes. Examples include, but are not limited to, artificial neural network algorithms, Gaussian process regression algorithms, fuzzy logic-based algorithms, decision tree algorithms, etc., as will be described in more detail below. In some embodiments, more than one machine learning algorithm may be employed. For example, automated classification of object defects may be implemented using one type of machine learning algorithm, and adaptive real-time process control may be implemented using a different type of machine learning algorithm. In some embodiments, hybrid machine learning algorithms that comprise features and properties drawn from two, three, four, five, or more different types of machine learning algorithms may be employed to implement the disclosed methods and systems.

In some embodiments, the disclosed methods for automated classification of object defects and adaptive real-time control may be implemented using components, e.g., additive manufacturing and/or welding apparatus, process control monitors or sensors, machine vision systems, and/or post-build inspection tools, which are co-localized in a specific workspace and which have been integrated to form stand-alone, self-contained systems. In some embodiments, the disclosed methods may be implemented using modular components, e.g., additive manufacturing and/or welding apparatus, process control monitors or sensors, machine vision systems, and/or post-build inspection tools, that are distributed over different workspaces and/or different worksites, and that are linked via a local area network (LAN), an intranet, an extranet, or the internet so that process data (e.g., training data, process simulation data, process control data, and post-build inspection data) and process control instructions may be shared and exchanged between the different modules. In some embodiments, a plurality of additive manufacturing and/or welding apparatus are linked to the same distributed system so that process data is shared amongst two or more additive manufacturing and/or welding apparatus control systems, and used to update the training data set for the entire distributed system.

The disclosed methods and systems for automated object defect classification and adaptive real-time control of additive manufacturing and/or welding apparatus may provide for rapid optimization and adjustment of the process control parameters used in response to changes in process or environmental parameters, as well as improved process yield, process throughput, and quality of the parts that are produced. The methods and systems are applicable to parts fabrication in a variety of different technical fields and industries including, but not limited to, the automotive industry, the aeronautics industry, the medical device industry, the consumer electronics industry, etc.

Unless otherwise defined, all technical terms used herein have the same meaning as commonly understood by one of ordinary skill in the art in the field to which this disclosure belongs. As used in this specification and the appended claims, the singular forms "a", "an", and "the" include plural references unless the context clearly dictates otherwise. Any reference to "or" herein is intended to encompass "and/or" unless otherwise stated.

As used herein, the term "process window" refers to a range of process control parameter values for which a specific manufacturing process yields a defined result. In some instances, a process window may be illustrated by a graph of process output plotted as a function of multiple process control parameters, with a central region indicating the range of parameter values for which the process behaves well, and outer borders that define regions where the process becomes unstable or returns an unfavorable result.

Prior to beginning deposition, a set of process parameters typically needs to be chosen and the equipment needs to be adjusted accordingly. Important process control parameters for laser-metal wire deposition include the laser power setting, the wire feed rate, and the traverse speed. These control the energy input, the deposition rate and the cross-section profile of the layer being deposited, i.e., the width and the height of the layer. The height (or thickness) of the deposited layer is determined by the amount of wire that is fed into the melt pool in relation to the traverse speed and the laser power. Once the nominal laser power, traverse speed, and the wire feed rate have been specified, there may be additional parameters to set, e.g., the relative orientation of the wire feed to the laser beam and substrate for a given traverse speed. Careful adjustment of these parameters is necessary in order to attain stable deposition on a flat surface. Examples of process control parameters that may need to be considered in order to achieve stable deposition of uniform beads of material on a flat surface are described in U.S. Pat. No. 10,921,782B2, the disclosure from which, including the relevant disclosure related to process control parameters, is incorporated by reference herein in its entirety.

If the deposition apparatus is set-up so that the wire tip spends too much time in the laser beam (e.g., by choosing a feed angle that is too high in relation to the other process control parameters), it will reach the melting temperature somewhere prior to entering the melt pool. The transfer of metal between the solid wire and the melt pool might then be stretched to a point where surface tension can no longer maintain the flow of metal, resulting in the formation and separation of surface tension-induced spherical droplets. This type of deposition gives rise to highly irregular bead shapes and a poor deposition process. Once globular transfer starts, it is typically hard to abort. The physical contact between the molten wire tip and the melt pool must be re-established, and the process control parameters must be adjusted to appropriate values.

Alternatively, if the wire feed angle is carefully adjusted so that the wire is melted close to the intersection with the melt pool, there will be a smooth transfer of metal from the solid wire to the liquid metal of the melt pool. The resulting beads of deposited metal will have a smooth surface and a stable metallurgical bond to the substrate.

Another way to melt the wire is by heat conduction from the melt pool, i.e., by plunging the wire into the melt pool. Precautions must be taken to adjust the wire feed rate to a value sufficiently low relative to the melting rate provided by the heat energy in the melt pool that the wire melts completely. Incomplete melting can result in, for example, lack of fusion (LOF) defects. Note that LOF defects may occur even at low wire feed rates for which the resulting beads are more or less indistinguishable from normal bead depositions.

Adjustment of process parameters: The process control parameters described above are adjusted depending on the choice of material and the energy input required to melt the material, which in turn is determined based on the desired deposition rate, deformation restrictions, the material's viscosity, and the available laser power and beam spot sizes. These factors put a requirement on the laser power, the traverse speed, and the wire feed rate settings. The laser beam should preferably be as orthogonal to the melt pool as possible to minimize reflection while avoiding back reflection into the optical system. The wire tip position relative to the melt pool should be adjusted with regard to the chosen amount of material deposited per time unit. If a front feed configuration is used and the deposition rate is low, the wire should enter the melt pool closer to the leading edge. Changing this parameter mainly affects the maximum and minimum wire feed rate for the chosen laser power and traverse speed. A closely related parameter to the wire tip position is the wire/substrate angle. If the angle is low, high wire feed rates might be possible since plunging can be exploited in a better way. However, for extreme wire feed rates, only front feeding is feasible. This then limits the choice of complex deposition paths, such as zig-zag or spiral patterns. To decrease the sensitivity of the deposition process to feed direction and thereby allow for arbitrary deposition patterns, the angle between the wire and the substrate should be increased. However, increased flexibility in terms of allowable deposition patterns is often achieved at the cost of a smaller process window.

Multi-layered deposition: Obtaining stable deposition of a single bead of material on a flat substrate requires careful adjustment of the process control parameters, as discussed above. Ultimately, however, the goal is to deposit three-dimensional parts, i.e., to deposit several adjacent beads in a layer, and to repeat the deposition for a number of layers. The transition from deposition of a single bead to deposition of a three-dimensional part is often not straightforward. The precise shape of the individual layers is influenced by several additional factors, e.g., the deposition pattern, the distance between adjacent beads, and the motion control system's speed and path accuracy. The relationship between these factors and their impact of the resulting layer are complex and hard to predict, which complicates the adjustment of process control parameters required to achieve a given deposition design feature, e.g., the layer height. Another example of a factor that complicates the deposition of three-dimensional parts is the potential increase in local temperature of the part due to heat accumulation, which needs to be considered during multi-layered deposition. Heat may be accumulated in the deposited part, for example, due to the use of overly short pauses between deposition of adjacent layers.

The additional uncertainties that arise in three-dimensional deposition may create a problem from a process stability point of view. For example, if the estimate of layer height to be achieved is incorrect, the relationship between the wire tip and the substrate will be different from what was expected for the process parameters as originally set. As a result, the deposition process might transition from a smooth transfer of the molten wire to either a globular deposition mode or a wire plunging mode. Consequently, as long as the deposition process is not sufficiently understood and/or tightly controlled that the dimensions of the individual layers can be accurately predicted, three-dimensional deposition may require continuous on-line monitoring and/or process control parameter adjustment.

Difficulties in Optimizing Additive Manufacturing Processes:

Some of the difficulties discussed above in the context of laser-metal wire deposition are also applicable to other additive manufacturing processes (Guessasma, et al., (2015) "Challenges of Additive Manufacturing Technologies from an Optimisation Perspective", Int. J. Simul. Multisci. Des. Optim. 6, A9). Generation of the toolpaths from three-dimensional CAD models represents the first challenge. Most additive manufacturing technologies rely on a successive layer-by-layer fabrication process, so starting from a three-dimensional representation of the part (i.e., a tessellated version of the part's actual surface) and ending with a two-dimensional build strategy may introduce errors. The problem is particularly prevalent in droplet-based 3D printing approaches, as discontinuities in the fused material may appear in all build directions as a result of the layer-by-layer deposition process, and may lead to dimensional inaccuracy, unacceptable finish state, and structural and mechanical anisotropies. Anisotropy may also arise in the development of particular grain texture, for example, in laser melting deposition or arc welding of metals. Reduction of anisotropy may sometimes be achieved by selecting the appropriate build orientation of the virtual design.

In addition, the differences between a virtual design and the as-fabricated object may sometimes be significant due to the finite spatial resolution available with the additive manufacturing tooling used, or due to part shrinkage during solidification of the deposited material, which can cause both changes in dimension as well as deformation of the part. Consider, for example, fused deposition modelling for which the toolpath comprises a collection of filament paths of finite dimension. This has three main consequences on the fabricated object: (i) internal structural features may not be well captured depending on their size; (ii) discontinuities may appear depending on local curvature; and (iii) the surface finish state may be limited due to rough profiles arising from the fusing of multiple filaments.

One consequence of the discontinuous fabrication process and other issues related to additive manufacturing process errors is porosity. Many technical publications have been directed to the evaluation of the effect of porosity in printed parts. One particular consequence is that porosity may reduce the mechanical performance of the part, e.g., through a decrease of stiffness with increased porosity level, or through lower mechanical strength under tension because of the development of porosity-enhanced damage in the form of micro-cracks. It should be noted that porosity may not always be viewed as a negative consequence of additive manufacturing processes, as it can be used, for example, to increase permeability in some applications.

Another type of defect encountered with some additive manufacturing processes is the presence of support material trapped between internal surfaces. Support material is sometimes needed to reinforce fragile printed structures during the printing process. Although these materials are typically selected to exhibit limited adhesion to the deposited materials, incomplete removal resulting in residual amounts of support material in the part may contribute to, for example, increased weight of the part and a modified load bearing distribution, which in turn may alter the performance of the part relative to that expected based on the original design. In addition, non-optimized support deposition may affect the finish state of the part, material consumption, fabrication time, etc. Various strategies have been described in the literature to reduce the dependence of additive manufacturing processes on the use of support materials. The strategies may vary depending on the geometry of the part and the choice of material to be deposited.

Welding Processes:

In some embodiments, the disclosed defect classification and process control methods and systems may be applied to welding processes and apparatus instead of, or in combination with, additive manufacturing processes and apparatus. Examples of welding processes and apparatus that may be employed with the disclosed process control methods and systems include, but are not limited to, laser beam welding processes and apparatus, MIG (metal inert gas) welding processes and apparatus (also referred to as gas metal arc welding), TIG (tungsten inert gas) welding processes and apparatus, and the like. Examples of CAD files, toolpaths, additive manufacturing processes and apparatus that may be employed with the processes described herein are described in U.S. Pat. No. 10,921,782B2, the disclosure from which, including the relevant disclosure related to CAD files, toolpaths, and additive manufacturing processes, is incorporated by reference herein in its entirety.

FIGS. 3A-C provide schematic illustrations of the conversion of a CAD design for a three-dimensional object to a continuous, spiral wound "two-dimensional" layer (of finite thickness) and associated helical tool path (FIG. 3A), or a stacked series of "two-dimensional" layers and associated circular, layer-by-layer tool paths (FIG. 3B) for deposition of material using an additive manufacturing process. FIG. 3C provides an illustration of the tool path for a robotically manipulated deposition tool and a simulation of the resulting object fabricated using an additive manufacturing process. Tool path and part simulation using a software package such as Octopuz (Jupiter, Fla is performed before running the deposition process on an actual deposition system. In some instances, the predicted optimal tool path may be locally modified during the deposition process in response to closed-loop feedback control. In some instances, the tool path may be reconstructed based on the as-built part geometry after the deposition process is complete.

Process Simulation Tools:

In some embodiments of the disclosed adaptive process control methods and systems, process simulation tools may be used to simulate the free form deposition process (or joining process) and/or to provide estimates of optimal sets (and/or sequences) of process control parameter settings (and adjustments). Any of a variety of process simulation tools known to those of skill in the art may be used including, but not limited to finite element analysis (FEA), finite volume analysis (FVA), finite difference analysis (FDA), computational fluid dynamics (CFD), and the like, or any combination thereof. In some embodiments of the disclosed methods and system, process simulation data from past fabrication runs is used as part of a training data set used to "teach" the machine learning algorithm used to run the process control. Examples of process simulation tools are described in U.S. Pat. No. 10,921,782B2, the disclosure from which, including the relevant disclosure related to process simulation tools, is incorporated by reference herein in its entirety.

As noted above, in some embodiments of the disclosed adaptive process control methods, FEA may be used to simulate a deposition process and/or to provide estimates of optimal sets and/or sequences of process control parameter settings and adjustments thereof. Examples of deposition process parameters that may be estimated using FEA analysis (or other simulation techniques) include, but are not limited to, a prediction of a bulk or peak temperature of a deposited material, a cooling rate of a deposited material, a chemical composition of a deposited material, a segregation state of constituents in a deposited material, a geometrical property of a deposited material, an angle of overhang in a deposited geometry, an intensity of heat flux out of a material during deposition, an electromagnetic emission from a deposition material, an acoustic emission from a deposition material, or any combination thereof, as a function of a set of specified input process control parameters. Because the process control parameters used as input for the calculation may be adjusted to determine how they impact the simulated deposition process, iterative use of process simulation may be used to provide estimates of optimal sets and/or sequences of process control parameter settings and adjustments thereof.

Figure 4B:
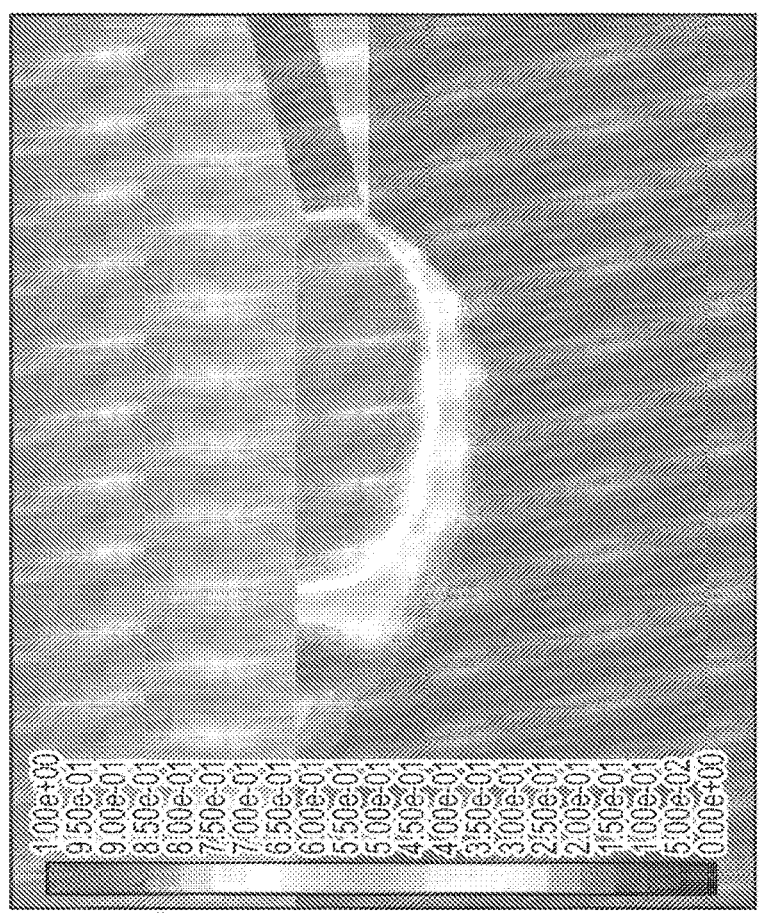
FIGS. 4A-C provide examples of FEA simulation data for modeling of a laser-metal wire deposition melt pool.
Figure 4A:
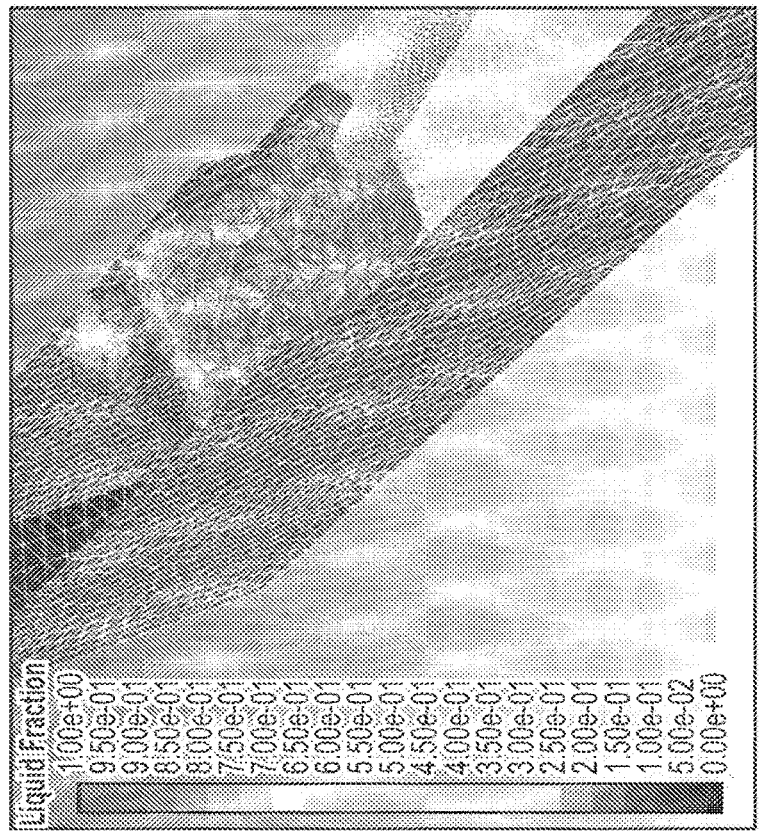
Figure 4C:
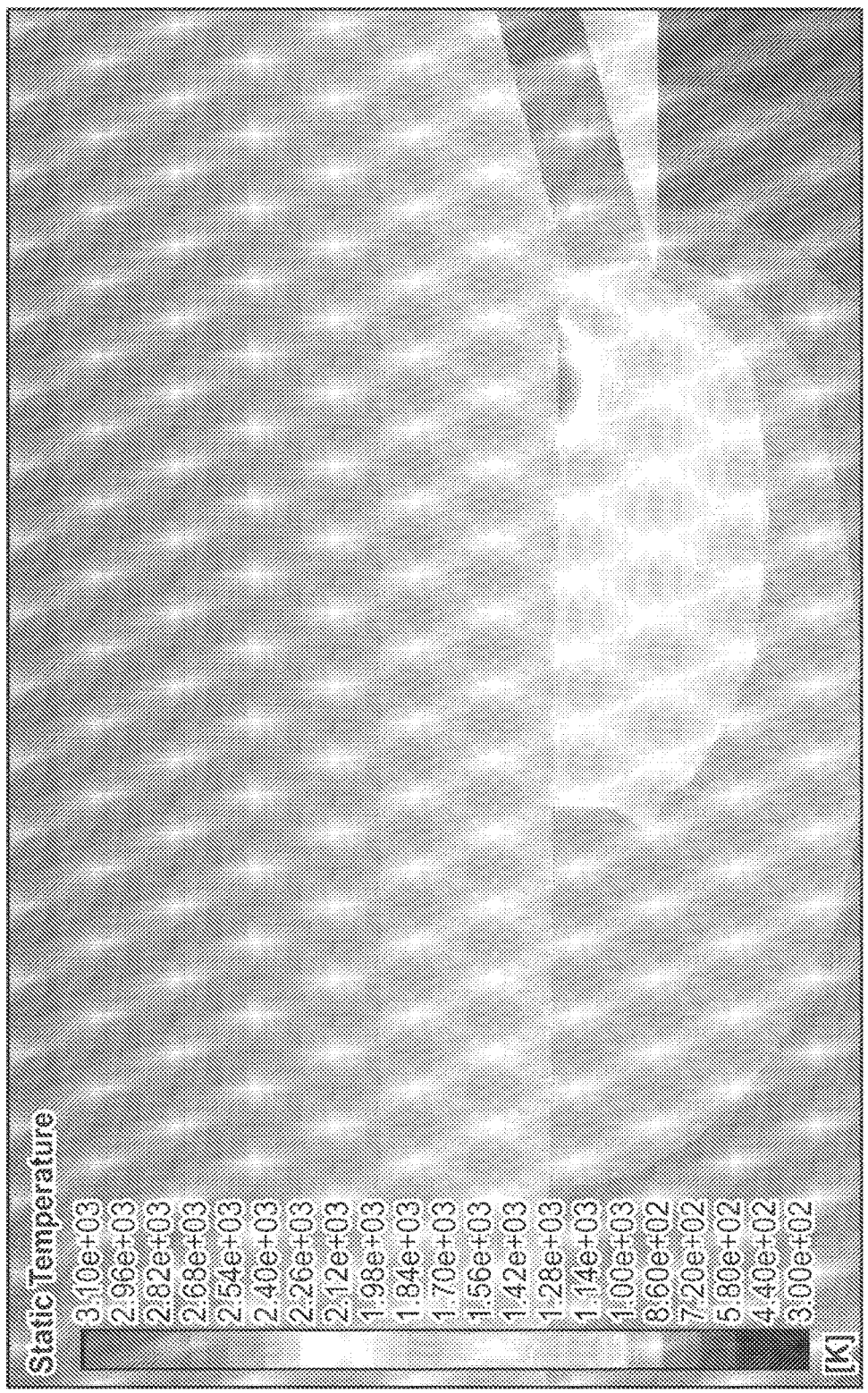

FIGS. 4A-C provide examples of FEA simulation data for modeling of a laser-metal wire deposition melt pool. FIG. 4A: isometric view of color-encoded three-dimensional FEA simulation data for the liquid fraction of material in the melt pool being deposited by a laser-metal wire deposition process. The metal is in a completely liquid state at the position where the wire tip merges with the melt pool, and transitions to increasingly lower liquid fractions as it solidifies downstream from the position of the wire. FIG. 4B: cross-sectional view of the FEA simulation data for the liquid fraction of material in the melt pool. FIG. 4C: cross-sectional view of color-encoded three-dimensional FEA simulation data for the static temperature of the material in the melt pool. The temperature is at a maximum value (approximately 2,900° K in this example) at the point where the laser beam impinges on the wire tip, and is asymmetrically distributed along the motion path of the deposition apparatus with higher temperatures exhibited by the material immediately downstream from the wire tip.

Process Control Parameters:

In some embodiments of the disclosed adaptive process control methods, one or more free form deposition process control parameters (or joining process control parameters) may be set and/or adjusted in real-time through the use of a machine learning algorithm that processes real-time deposition or welding process monitoring data, e.g., data from a machine vision system or laser interferometry measurement system, and uses that information to adjust the one or more process control parameters to improve the efficiency of the process and/or the quality of the part being fabricated.

In general, the types of process control parameters that may be set and/or adjusted by the adaptive process control system will vary depending on the specific type of free form deposition, additive manufacturing, or welding process being used. Examples of process control parameters that may be set and/or adjusted include, but are not limited to, the rate of material deposition, the rate of displacement for a deposition apparatus, the rate of acceleration for a deposition apparatus, the direction of displacement for a deposition apparatus, the location of a deposition apparatus as a function of time (i.e., a tool path), the angle of a deposition apparatus with respect to a deposition direction, the angle of overhang in an intended geometry, the intensity of heat flux into a material during deposition, the size and shape of a heat flux surface, the flow rate and angle of a shielding gas flow, the temperature of a baseplate on which material is deposited, the ambient temperature during a deposition process, the temperature of a deposition material prior to deposition, a current or voltage setting in a resistive heating apparatus, a voltage frequency or amplitude in an inductive heating apparatus, the choice of deposition material, the ratio by volume or the ratio by weight of deposition materials if more than one deposition material is used, or any combination thereof.

As indicated above, examples of process control parameters for a laser-metal wire deposition process that may be set and/or adjusted by the adaptive process control systems of the present disclosure include, but are not limited to, laser power, laser power distribution (or beam profile), laser/wire or laser/substrate angle, laser beam size and shape, laser beam focal length, laser wavelength, wire feed rate, wire diameter, wire/substrate angle, wire tip position relative to the melt pool, wire stick-out, shield gas settings, feed direction, and traverse speed.

In some embodiments of the disclosed adaptive process control methods and system, one or more process control parameters may be set and/or adjusted by the machine learning algorithm used to run the control process. In some embodiments, the number of different process control parameters to be set and/or adjusted may be at least 1, at least 2, at least 3, at least 4, at least 5, at least 10, at least 15, or at least 20. Those of skill in the art will recognize that the number of different process control parameters to be set and/or adjusted by the disclosed process control methods and systems may have any value within this range, e.g., 12 process control parameters.

Process Monitoring Tools:

In some embodiments of the disclosed adaptive process control methods and systems, one or more process monitoring tools may be used to provide real-time data on process parameters or properties of the object being fabricated, both of which will be referred to herein as "process characterization data". In some embodiments of the disclosed methods and system, process characterization data from past fabrication runs is used as part of a training data set used to "teach" the machine learning algorithm used to run the process control. In some embodiments, real-time (or "in-process") process characterization data is fed to the machine learning algorithm so that it may adaptively adjust one or more process control parameters in real-time.

Any of a variety of process monitoring tools known to those of skill in the art may be used including, but not limited to, temperature sensors, position sensors, motion sensors, touch/proximity sensors, accelerometers, profilometers, goniometers, image sensors and machine vision systems, electrical conductivity sensors, thermal conductivity sensors, strain gauges, durometers, X-ray diffraction or imaging devices, CT scanning devices, ultrasonic imaging devices, Eddy current sensor arrays, thermographs, deposition apparatus status indicators, or any combination thereof. In some embodiments, the process characterization sensors may comprise one or more sensors that detect electromagnetic radiation that is reflected, scattered, absorbed, transmitted, or emitted by the object. In some embodiments, the process characterization sensors may comprise one or more sensors that provide data on acoustic energy or mechanical energy that is reflected, scattered, absorbed, transmitted, or emitted by the object.

Any of a variety of process parameters may be monitored (i.e., to generate process characterization data) using appropriate sensors, measurement tools, and/or machine vision systems including, but not limited to, measurement of a bulk or peak temperature of a deposited material, a cooling rate of a deposited material, a chemical composition of a deposited material, a segregation state of constituents in a deposited material, a geometrical property of a deposited material (e.g., a local curvature of a printed part), a rate of material deposition, a rate of displacement for a deposition apparatus, a location (tool path) of a deposition apparatus, an angle of a deposition apparatus with respect to a deposition direction, a deposition apparatus status indicator, an angle of overhang in a deposited geometry, an angle of overhang in an intended geometry, an intensity of heat flux into a material during deposition, an intensity of heat flux out of a material during deposition, an electromagnetic emission from a deposition material, an acoustic emission from a deposition material, an electrical conductivity of a deposition material, a thermal conductivity of a deposition material, a defect in the geometry of an object being fabricated, or any combination thereof.

The disclosed methods and systems for adaptive process control may comprise the use of any number and any combination of sensors or process monitoring tools. For example, in some embodiments, an adaptive deposition process control system of the present disclosure may comprise a number of sensors or process monitoring tools. In some embodiments, the one or more sensors or process monitoring tools may provide data to the process control algorithm at an update rate of at least 0.1 Hz, 1 Hz, 5 Hz, 10 Hz, 20 Hz, 30 Hz, 40 Hz, 50 Hz, 60 Hz, 70 Hz, 80 Hz, 90 Hz, 100 HZ, 250 Hz, 500 Hz, 750 Hz, 1,000 Hz, 2,500 Hz, 5,000 Hz, 10,000 Hz, or higher. Those of skill in the art will recognize that the one or more sensors or process monitoring tools may provide data at an update rate having any value within this range, e.g., about 225 Hz.

Figure 5:
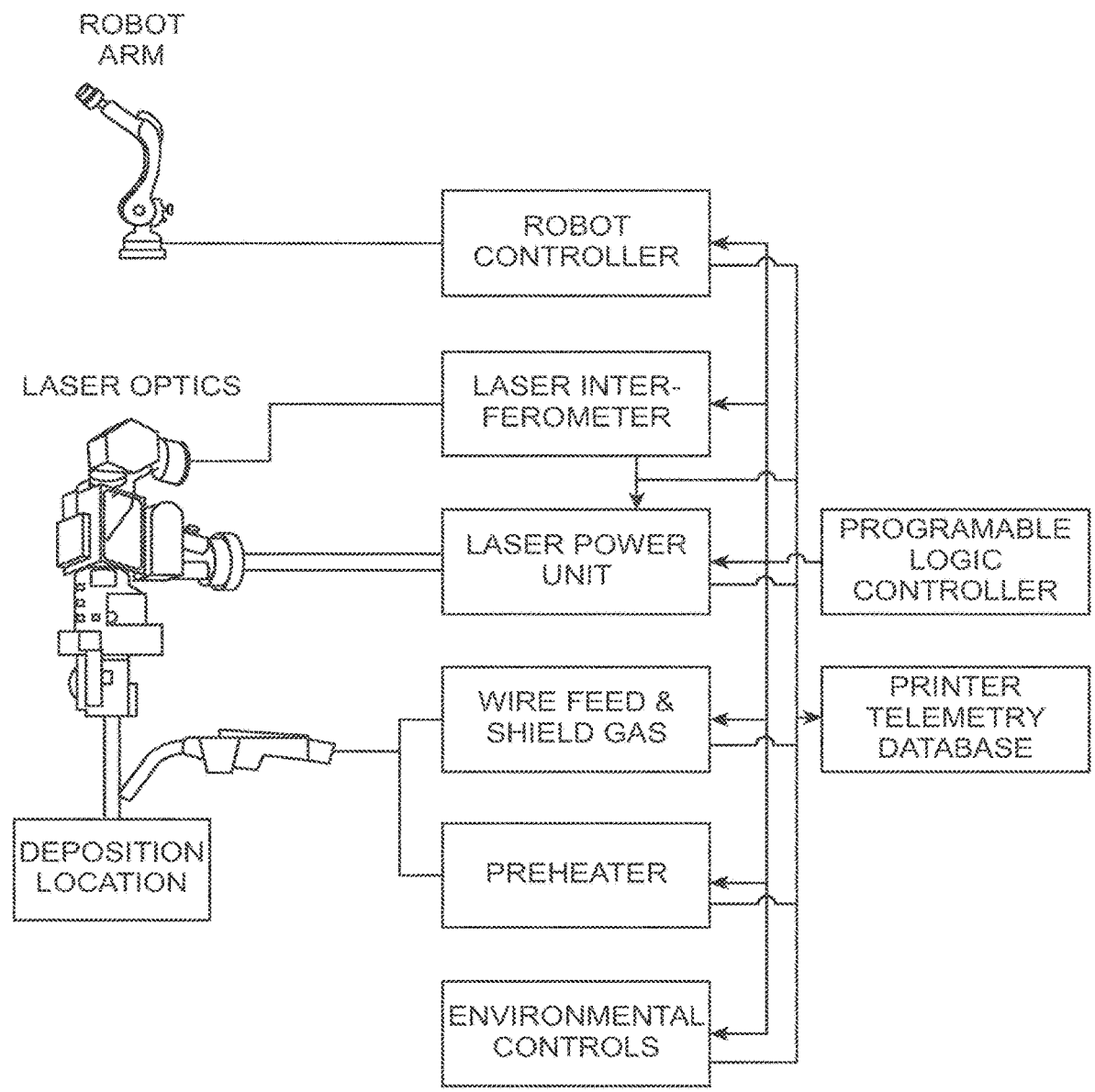
FIG. 5 is a diagram of one non-limiting example of a specific type of additive manufacturing system, i.e., a laser-metal wire deposition system.

FIG. 5 illustrates one non-limiting example of a laser-metal wire deposition system that comprises a robotic controller, a laser power unit, a wire feed and shield gas module, a wire pre-heater, and environmental controller, a telemetry database (for transmitting and recording process control instructions sent to and process monitoring data read from the deposition system), and a programmable logic controller (which coordinates the overall operation of the system components), as well as a laser interferometer. The laser interferometer provides real-time feedback on melt pool properties. In some embodiments, the deposition system may further comprise a processor programmer to utilize a machine learning algorithm, e.g., an artificial neural network, for real-time, adaptive control of the metal deposition process. In some embodiments, the deposition system may also include machine vision systems or other inspection tools monitor process parameters and/or to provide for automated classification of object defects (post-build or in-process), and may incorporate such process monitoring or defect classification for use by the machine algorithm in predicting next action(s) by the deposition process.

Figure 2:
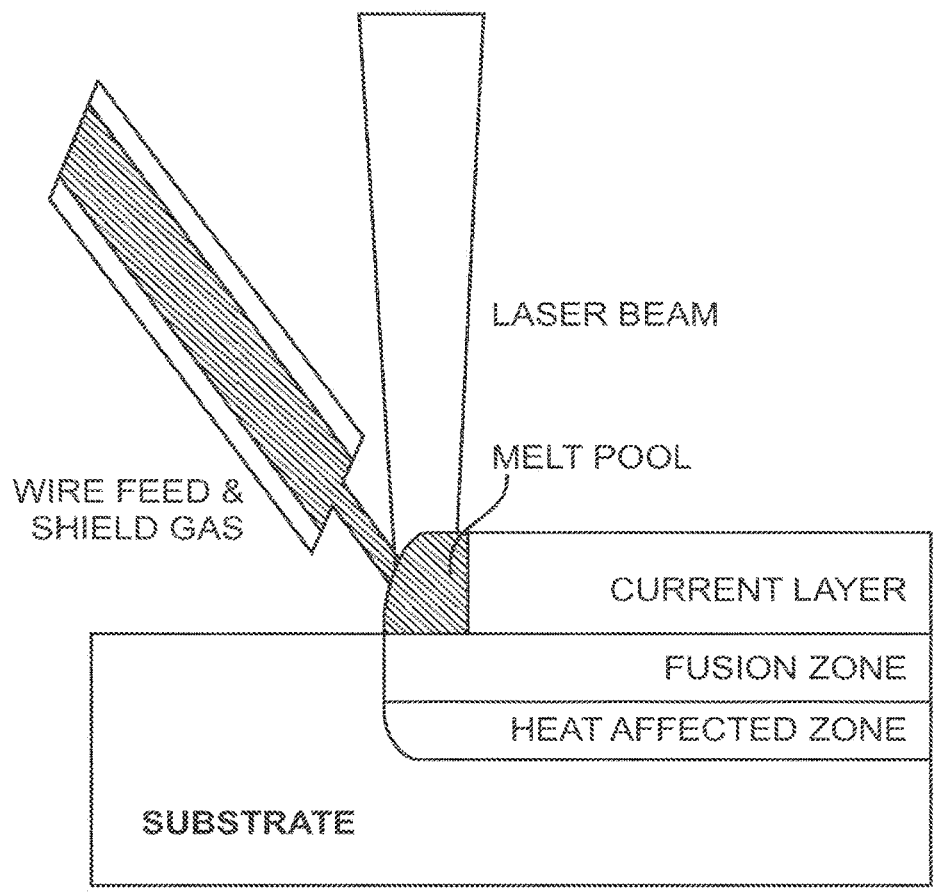
FIG. 2 is a schematic diagram of an example set-up for a material deposition process, e.g., a laser-metal wire deposition process, according to some embodiments of the present disclosure.

FIG. 2 provides a schematic illustration of an example set-up for a material deposition process, e.g., a laser-metal wire deposition process, according to some embodiments of the present disclosure. The laser beam impinges on the metal wire to create a melt pool at the point of intersection and deposit material on a substrate. The melt pool material subsequently hardens to form a new layer as the laser and wire feed (i.e., the print head) are moved relative to the substrate. The wire is shielded from air-borne contaminants with the use of a sheath of shield gas. As indicated by the example of FEA simulation date presented in FIG. 4C, heat propagates from the position of the melt pool through the underlying substrate (or previously deposited layers) in an asymmetric fashion due to the translational motion of the print head relative to the substrate. The newly deposited layer forms a metallurgical bond with the substrate (or previously deposited layers) in a region referred to as the fusion zone. The propagation of heat through the newly deposited layer to the substrate (or previously deposited layers) may in some instances affect material properties within a region referred to as the heat affected zone. The solidification process may also cause metallurgical defects such as pores and cracks to form in the deposited layer. The quantity and type of defects that arise are dependent on the amount of heat input, the time spent at elevated temperatures, the geometry of the printed part, and the presence of contaminants near the melt pool.

Figure 6A:
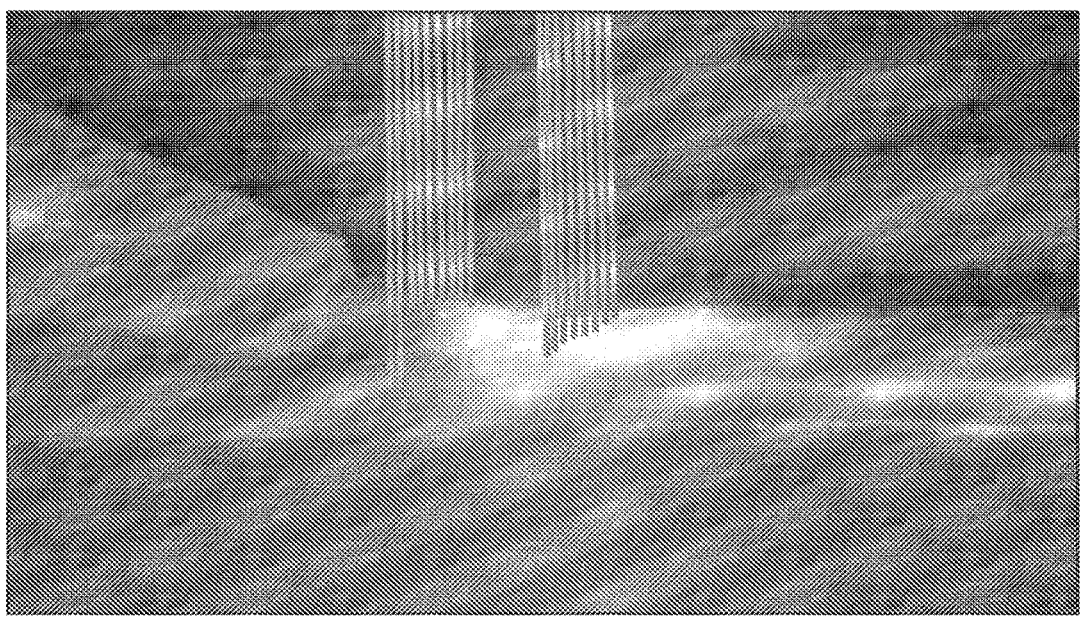
FIGS. 6A-B illustrate one non-limiting example of in-process feature monitoring using interferometry.
Figure 6B:
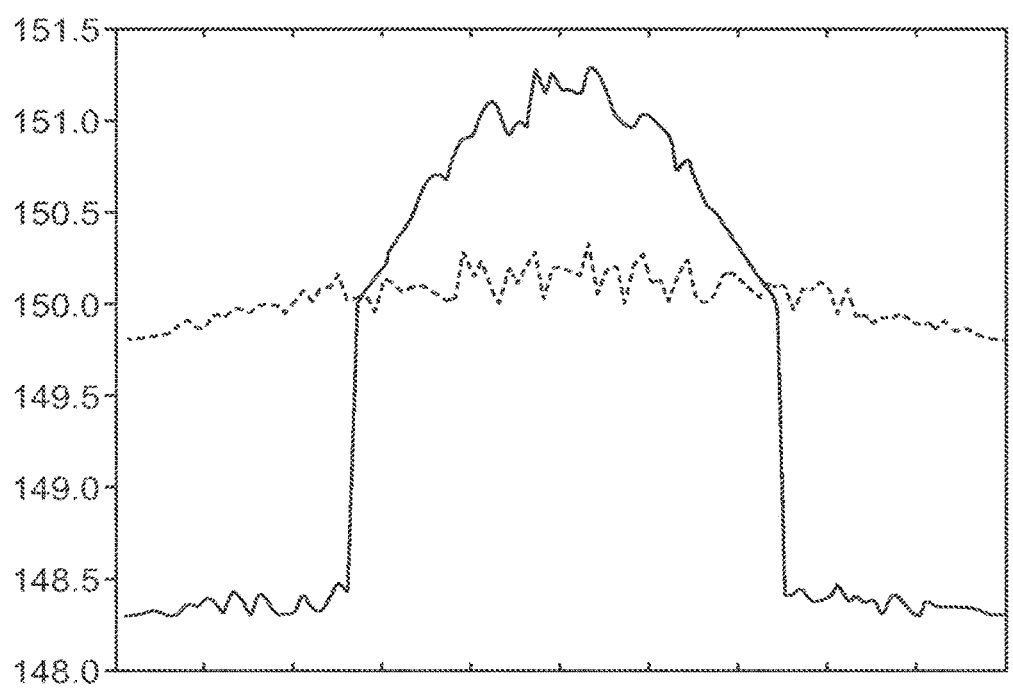

FIGS. 6A-B illustrate the use of laser interferometry to monitor melt pool and deposition layer properties in a laser-metal wire deposition process. FIG. 6A shows a micrograph of the deposition process at the location where the laser beam impinges on the metal wire. The vertical lines indicate the position of the interferometer probe beam as it is used to monitor the height profile of the wire feed and previously deposited layer and resulting melt pool. FIG. 6B provides examples of cross-sectional profiles (i.e., height profiles across the width of the deposition) of the wire feed, previously deposited layer, and melt pool as measured using laser interferometry at the position of the wire feed (solid line; the peak indicates the wire, while the shoulders indicate the height of the previously deposited layer) and the melt pool (dashed line). The x-axis (width) dimension is plotted in arbitrary units. The y-axis (height) dimension is plotted in units of millimeters relative to a fixed reference point below the deposition layer. In some embodiments of the disclosed adaptive process control methods, such real-time process monitoring data may be used by a processor running a machine learning algorithm to make adjustment(s) to one or more process control parameters in order to improve, for example, the dimensional accuracy of the layer, layer surface finish and/or adhesion properties, and/or the overall efficiency of the deposition process.

In some embodiments, laser interferometry may be used to monitor the dimensions and/or properties of the melt pool, the deposited layer downstream from the melt pool, or other features of the part being fabricated at one or more positions on the part. In some embodiment, laser interferometry may be used to monitor the dimensions and/or properties of the part being fabricated.

Figure 7A:
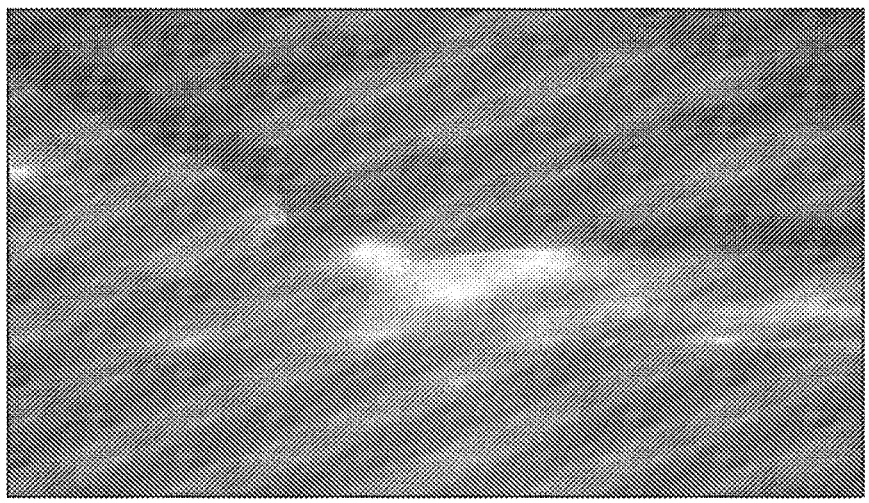
FIGS. 7A-C illustrate one non-limiting example of in-process feature extraction from images of a laser-metal wire deposition process obtained using a machine vision system.
Figure 7B:
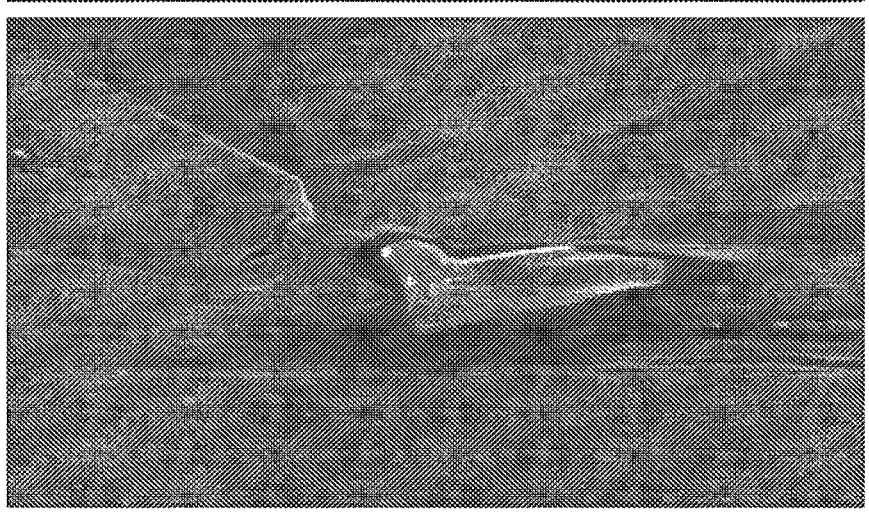
Figure 7C:
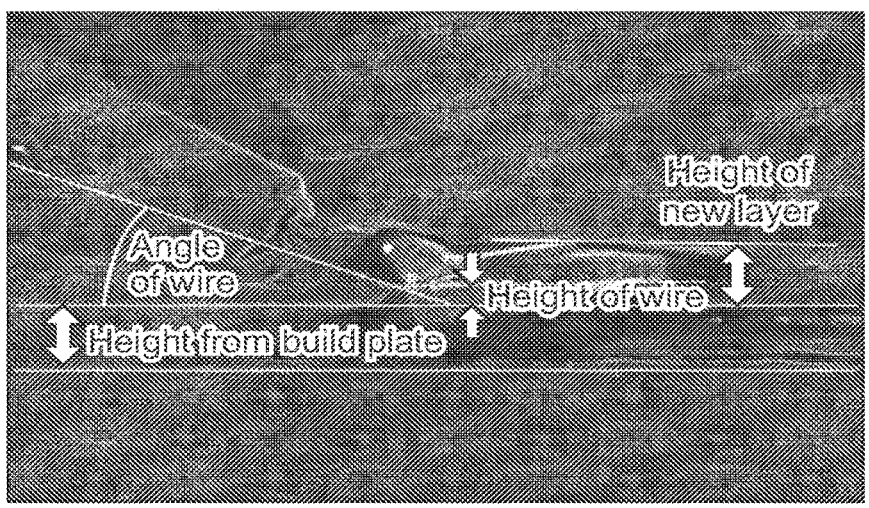

FIGS. 7A-C illustrate in-process feature extraction from images of a laser-metal wire deposition process obtained using a machine vision system. FIG. 7A shows a raw image (e.g., one image frame grabbed from a video rate data stream) of the melt pool adjacent to the tip of the wire. FIG. 7B shows the processed image after de-noising, filtering, and edge detection algorithms have been applied. FIG. 7C shows the processed image after application of a feature extraction algorithm used to identify, for example, the angel of the wire relative to the build plate and the height (thickness) of the new layer. Machine vision systems and the associated image processing capability allow one to monitor details of the deposition process in real-time.

In some embodiments, one or more machine vision systems may be used with the disclosed adaptive process control methods and systems to acquire and process single images. In some embodiments, one or more machine vision systems may be used with the disclosed adaptive process control methods and systems to acquire and process a series of one or more images at defined time intervals.

In some embodiments, one or more machine vision systems used with the disclosed adaptive process control methods and systems may be configured to acquire images at specific wavelengths (or within specific wavelength ranges) or in different imaging modes. For example, in some embodiments, one or more machine vision system may be configured to acquire images in the x-ray region, ultraviolet region, visible region, near infrared region, infrared region, terahertz region, microwave region, or radiofrequency region of the electromagnetic spectrum, or any combination thereof. In some embodiments, one or more machine vision systems may be configured to acquire fluorescence images (e.g., where the wavelength range for the excitation light is different than that for the collected fluorescence emission light). In some embodiments, one or more machine vision systems may be configured to acquire coherent Raman scattering (CRS) images (e.g., stimulated Raman scattering (SRS) or anti-Stokes Raman scattering (CARS) images) to provide label-free chemical imaging of the deposition layer or part being fabricated.

Post-Build Inspection Tools and Automated Defect Classification:

Disclosed herein are automated object defect classification methods and systems used to identify and characterize defects in fabricated parts. The approach is based on the use of a machine learning algorithm for detection and classification of defects, where the machine learning algorithm is trained using a training dataset that comprises post-build inspection data provided by a skilled operator and/or inspection data provided by any of a variety of automated inspection tools known to those of skill in the art. The disclosed automated object defect classification methods and systems may be applied to any of a variety of free form deposition or joining processes known to those of skill in the art. In some embodiments, the disclosed automated object defect classification methods and systems may be used strictly for post-build inspection of new parts. In some embodiments, they may be used in-process to provide real-time process characterization data to a machine learning algorithm used to run the process control, so that one or more process control parameters may be adjusted in real-time. In some embodiments, the disclosed automated object defect classification methods and systems may be used both in-process to provide real-time process characterization data and for post-build inspection. In some embodiments, in-process automated defect classification data may be used by the machine learning algorithm to determine a set or sequence of process control parameter adjustments that will implement a corrective action, e.g., to adjust a layer dimension or thickness, so as to correct a defect when first detected. In some embodiments, in-process automated defect classification may be used by the machine learning algorithm to send a warning or error signal to an operator, or optionally, to automatically abort the deposition process, e.g., an additive manufacturing process. In some embodiments, once trained, the automated defect classification system requires no further user input (e.g., no further input from a skilled operator or inspector) to detect and classify defects either in-process and/or post-build.

The automated object defect classification methods will generally comprise: a) providing a training data set, wherein the training data set comprises fabrication process simulation data, fabrication process characterization data, and/or post-build inspection data, or any combination thereof, for a plurality of design geometries that are the same as or different from that of the object; b) providing one or more sensors, wherein the one or more sensors provide real-time data for one or more object properties; c) providing a processor programmed to provide a classification of detected object defects using a machine learning algorithm that has been trained using the training data set of step (a), wherein the real-time data from the one or more sensors is provided as input to the machine learning algorithm and allows the classification of detected object defects to be adjusted in real-time.

Training data sets: As noted above, the training data set may comprise fabrication process simulation data, fabrication process characterization data, post-build inspection data (including inspection data provided by a skilled operator and/or inspection data provided by any of a variety of automated inspection tools), or any combination thereof, for past fabrication runs of a plurality of design geometries that are the same as or different from that of the object currently being fabricated. One or more training data sets may be used to train the machine learning algorithm used for object defect detection and classification. In some cases, the type of data included in the training data set may vary depending on the specific type of machine learning algorithm employed, as will be discussed in more detail below. For example, in the case that an expert system (or expert learning system) the training data set may comprise primarily defect classification data provided by a skilled operator or technician in visually identifying and classifying object defects for the same type of part or for a variety of different parts that share some common set of features. In some instances, the training data set may be updated in real-time with object defect and object classification date as it is performed on a given system. In some instances, the training data may be updated with object defect data and object classification data drawn from a plurality of automated defect classification systems.

In some embodiments, the training data set may comprise process simulation data, process characterization data, in-process inspection data, post-build inspection data, or any combination thereof. In some embodiments, the training data set may comprise a single type of data selected from the group consisting of process simulation data, process characterization data, in-process inspection data, and post-build inspection data. In some embodiments, the training data set may comprise a combination of any two or any three types of data selected from the group consisting of process simulation data, process characterization data, in-process inspection data, and post-build inspection data. In some embodiments, the training data set may comprise all of these types of data, i.e., process simulation data, process characterization data, in-process inspection data, and post-build inspection data.

Object property measurement: Any of a variety of sensors or other inspection tools may be used, including some of those listed above for process monitoring in general. In some embodiments, the one or more sensors (e.g., image sensors or machine vision systems) provide data on electromagnetic radiation that is reflected, scattered, absorbed, transmitted, or emitted by the object. In some embodiments, the electromagnetic radiation is x-ray, ultraviolet, visible, near-infrared, or infrared light. In some embodiments, the one or more sensors provide data on acoustic energy that is reflected, scattered, absorbed, transmitted, or emitted by the object. In some embodiments, the one or more sensors provide data on an electrical conductivity or a thermal conductivity of the object. In some embodiments, the one or more sensors may provide data to the processor programmed to provide a classification of detected object defects using a machine learning algorithm In a preferred embodiment the automated object defect classification methods and systems of the present disclosure may be implemented using image sensors and/or machine vision systems. Automated image processing of the captured images may then be used to monitor any of a variety of object properties, e.g., dimensions (overall dimensions, or dimensions of specific features), feature angles, feature areas, surface finish (e.g., degree of light reflectivity, number of pits and/or scratches per unit area), and the like. In some embodiments, object properties such as local, excessively high temperatures that may be correlated with defects or defect generation in printed or welded parts may be monitored using infrared or visible wavelength cameras.

Noise removal from sensor data: In some embodiments, the automated defect classification methods may further comprise removing noise from the object property data provided by the one or more sensors prior to providing it to the machine learning algorithm. Examples of data processing algorithms suitable for use in removing noise from the object property data provided by the one or more sensors include, but are not limited to, signal averaging algorithms, smoothing filter algorithms, Kalman filter algorithms, non-linear filter algorithms, total variation minimization algorithms, or any combination thereof.

Subtraction of reference data sets: In some embodiments of the disclosed automated defect classification methods, subtraction of a reference data set from the sensor data may be used to increase contrast between normal and defective features of the object, thereby facilitating defect detection and classification. For example, a reference data set may comprise sensor data recorded by one or more sensors for an ideal, defect-free example of the object to be fabricated. In the case that an image sensor or machine vision system is used for defect detection, the reference data set may comprise an image (or set of images, e.g., representing different views) of an ideal, defect-free object.

Machine learning algorithms for defect detection and classification: Any of a variety of machine learning algorithms may be used in implementing the disclosed automated object defect detection and classification methods. The machine learning algorithm employed may comprise a supervised learning algorithm, an unsupervised learning algorithm, a semi-supervised learning algorithm, a reinforcement learning algorithm, a deep learning algorithm, or any combination thereof. In preferred embodiments, the machine learning algorithm employed for defect identification and classification may comprise a support vector machine (SVM), an artificial neural network (ANN), or a decision tree-based expert learning system, some of which will be described in more detail below. In some preferred embodiments, object defects may be detected as differences between an object property data set and a reference data set that are larger than a specified threshold, and may be classified using a one-class support vector machine (SVM) or autoencoder algorithm. In some preferred embodiments, object defects may be detected and classified using an unsupervised one-class support vector machine (SVM), autoencoder, clustering, or nearest neighbor (e.g., kNN) machine learning algorithm and a training data set that comprises object property data for both defective and defect-free objects.

Adaptive, Real-Time Deposition Process Control Using a Machine Learning Algorithm:

Disclosed herein are methods and systems for providing real-time adaptive control of deposition processes, e.g., additive manufacturing or welding processes. In general, the disclosed methods comprise a) providing an input design geometry for an object (e.g., a 3D CAD model); b) providing a training data set, wherein the training data set comprises process simulation data, process characterization data, post-build inspection data, or any combination thereof, for a plurality of design geometries or portions thereof that are the same as or different from the input design geometry of step (a); c) providing a predicted optimal set or sequence of one or more process control parameters for fabricating the object, wherein the predicted optimal set of one or more process control parameters are derived using a machine learning algorithm that has been trained using the training data set of step (b); and d) performing the deposition process, e.g., an additive manufacturing process, to fabricate the object, wherein real-time process characterization data is provided by one or more sensors as input to the machine learning algorithm to adjust one or more process control parameters in real-time. In some embodiments, steps (b)-(d) are performed iteratively and the process characterization data, post-build inspection data, or any combination thereof for each iteration is incorporated into the training data set.

Training data sets: As with the automated defect classification methods described above, the training data set(s) used in teaching the process control machine learning algorithm may comprise fabrication process simulation data, fabrication process characterization data, post-build inspection data (including inspection data provided by a skilled operator and/or inspection data provided by any of a variety of automated inspection tools), or any combination thereof, for past fabrication runs of a plurality of design geometries that are the same as or different from that of the object currently being fabricated. One or more training data sets may be used to train the machine learning algorithm used for adaptive, real-time deposition process control. In some cases, the type of data included in the training data set may vary depending on the specific type of machine learning algorithm employed, as will be discussed in more detail below. For example, in some cases the training data set may comprise primarily process control settings provided by a skilled operator or technician in successfully fabricating a number of the same type of part or for a variety of different parts that share some common set of features. In some instances, the training data set may be updated in real-time using process simulation data, process control data, process characterization data, in-process inspection data, and/or post-build inspection data as fabrication is performed on a given system. In some instances, the training data may be updated using process simulation data, process control data, process characterization data, in-process inspection data, and/or post-build inspection data as fabrication is performed on a plurality of deposition and/or welding systems.

In some embodiments, the training data set may comprise process simulation data, process characterization data, in-process inspection data, post-build inspection data, or any combination thereof. In some embodiments, the training data set may comprise a single type of data selected from the group consisting of process simulation data, process characterization data, in-process inspection data, and post-build inspection data.

Process characterization data: Any of a variety of sensors, measurement tools, or inspection tools may be used for monitoring various process parameters in real-time, including those listed above. In some embodiments, for example, laser interferometers are used to monitor the dimensions of the melt pool (in the case of laser-metal wire deposition) or other part dimensions as the part is being fabricated. In some embodiments, the one or more sensors (e.g., image sensors or machine vision systems) provide data on electromagnetic radiation that is reflected, scattered, absorbed, transmitted, or emitted by the object. In some embodiments, the electromagnetic radiation is x-ray, ultraviolet, visible, near-infrared, or infrared light. In some embodiments, real-time image acquisition and processing is used to monitor, for example, the angle of the wire feed relative to a baseplate or previously deposited layer, or the thickness of a deposited layer.

In a preferred embodiment, the real-time process characterization data that is fed to the machine learning algorithm used to run process control may comprise data supplied by an automated object defect classification system as described above, so that the deposition process control parameters may be adjusted in real-time to compensate or correct for part defects as they arise during the build process. The machine learning algorithm used to run the automated process control may be configured to adjust the process control parameters in real-time as necessary to maximize a reward function (or to minimize a loss function), as will be discussed in more detail below.

Machine learning algorithms for automated deposition process control: Any of a variety of machine learning algorithms may be used in implementing the disclosed process control methods, and may be the same or different from those used to implement the automated object defect classification methods described above.

Reward functions and loss functions: As noted above, in some embodiments the machine learning algorithm used to run the automated process control may be configured to adjust the process control parameters in real-time as necessary to maximize a reward function (or to minimize a loss function) in order to optimize the deposition process. As used herein, a reward function (or conversely, a loss function (sometimes also referred to as a cost function or error function)) refers to a function that maps the values of one or more additive manufacturing process variables and/or fabrication event outcomes to a real number that represents the "reward" associated with a given fabrication event (or the "cost" in the case of a loss function). Examples of process parameters and fabrication event outcomes that may be used in defining a reward (or loss) function include, but are not limited to, process throughput (e.g. number of parts fabricated per unit time), process yield (e.g., the percentage of parts produced that meet a specified set of quality criteria), production quality (e.g., mean squared deviation in part dimension(s) between the parts produced and an ideal, defect-free reference part, or the average number of defects detected per part produced), production cost (e.g., the cost per part produced), and the like. In some cases, the definition of the reward function (or loss function) to be maximized (or minimized) may be dependent on the choice of machine learning algorithm used to run the process control method, and vice versa. For example, if the objective is to maximize a total reward/value function, a reinforcement learning algorithm may be chosen. If the objective is to minimize a mean squared error cost (or loss) function, a decision tree regression algorithm or linear regression algorithm may be chosen. In general, the machine learning algorithm used to run the process control method will seek to optimize the reward function (or minimize the loss function) by (i) identifying the current "state" of the part under fabrication (e.g., based on the real-time stream of process characterization data supplied by one or more sensors), (ii) comparing the current "state" to the design target (or reference "state"), and (iii) adjusting one or more process control parameters in order to minimize the difference between the two states (e.g., based on past "learning" provided by the training data set).

Figure 8:
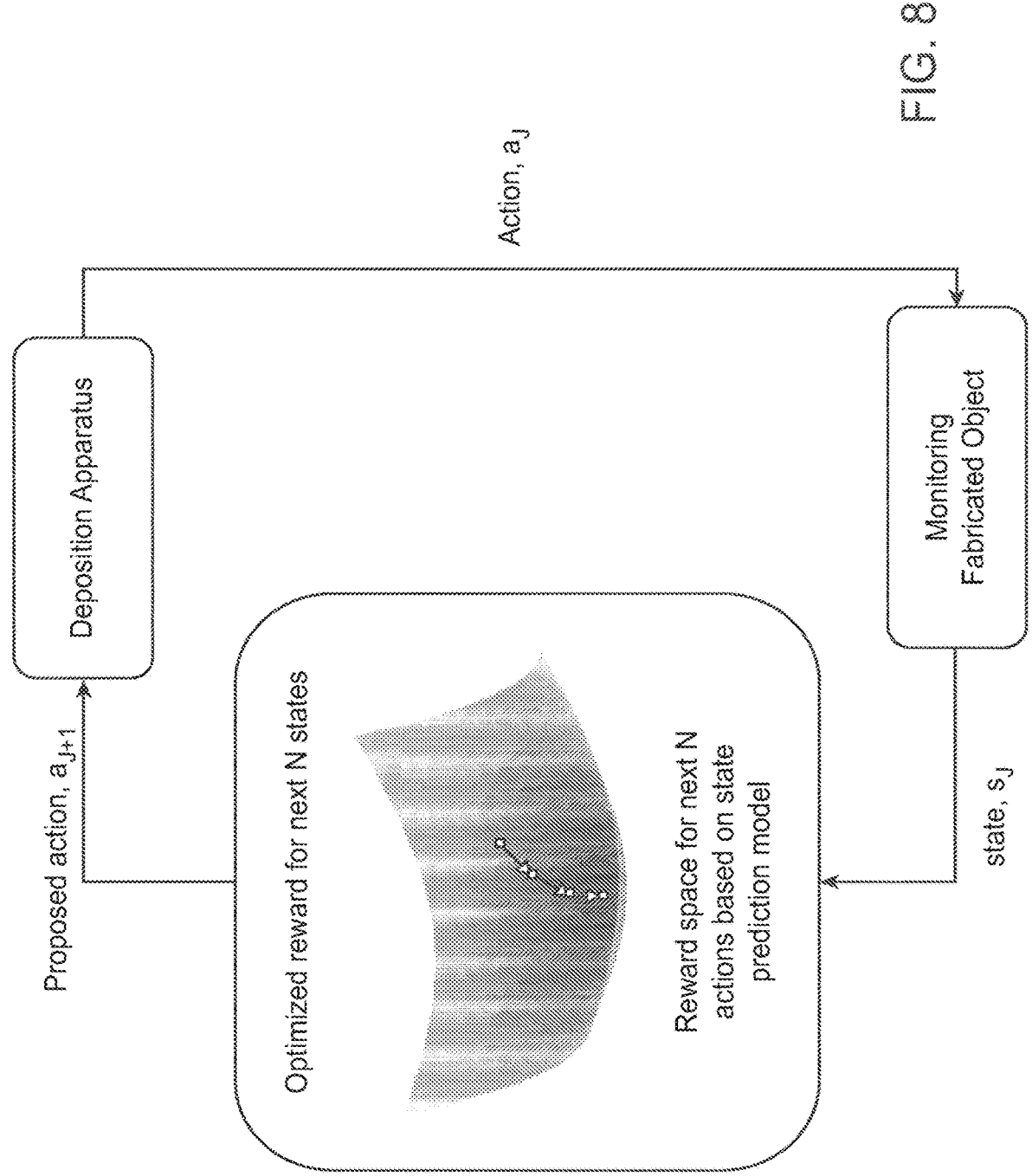
FIG. 8 illustrates an action prediction-reward loop for a reinforcement learning algorithm according to some embodiments of the present disclosure.

FIG. 8 illustrates an action prediction-reward loop for a reinforcement learning algorithm according to some embodiments of the disclosed deposition or welding process control methods. In the case of a deposition process, for example, at any point in time during or following completion of layer deposition (action $a_j$), the part being fabricated is monitored using any of a variety of sensors, measuring tools, inspection tools, and/or machine vision systems as described above to determine the current build "state" of the part (state $s_j$). In a preferred embodiment, the part is monitored in real-time using an automated object defect classification system as disclosed herein. Once the current build state of the part has been determined, a reinforcement learning algorithm uses the current state information, $s_j$, and the model developed using past training data to predict a proposed action, $a_{j+1}$, (e.g., a set or sequence of process control parameter adjustments) that will maximize a reward function. If the current build state, $s_j$, is relatively poor (i.e., associated with a low value of the reward function), it may not be desirable to simply take the set of actions that produces the highest reward in the next build state, $s_{j-1}$, because that may not produce the maximum reward in the long run. In some cases, maximizing the reward for the immediate next build state, $s_{j+1}$, may force a decision between very low reward states for next few build states, e.g., $s_{j+2}$, $s_{j+3}$, $s_{+4}$, thereafter. By using the learned process model to look a bit further into the future, one can optimize the process control parameter adjustments for the next N build states as opposed to just the immediate next state. Each set of "next N states" starting from state si has a corresponding reward (i.e., the reward space for the next N actions) that can be predicted using the previously trained model that predicts the correlation between actions and their resulting state. Thus, the learned model may be used to determine a sequence of actions that optimizes the sum (or weighted sum) of reward values for the next N states. The loop is repeated until the part is complete, and provides adaptive control of the deposition process to provide for rapid optimization and adjustment of the process control parameters used in response to changes in process or environmental parameters, as well as improved process yield, process throughput, and quality of the parts.

Figure 9:
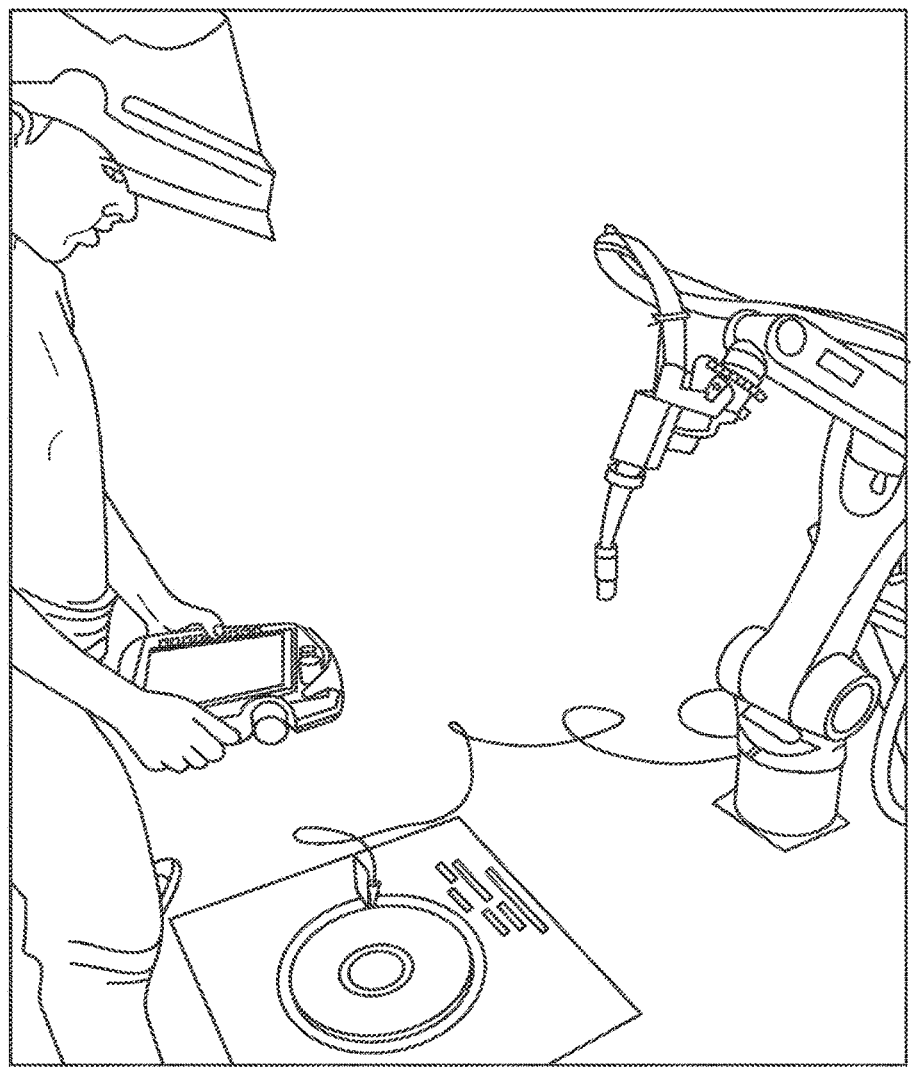
FIG. 9 illustrates reward function construction based on monitoring the actions that a human operator chooses during a manually-controlled deposition process.

FIG. 9 illustrates reward function construction where the training data used to generate the reward function-based state prediction model is acquired by monitoring the actions that a human operator chooses during a manually-controlled deposition process. In some embodiments, the machine learning algorithm may be wholly or partially self-trained. For example, in some embodiments, as part of the training of the machine learning algorithm, the machine learning algorithm may randomly choose values within a specified range for each of a set of one or more process control parameters, and incorporate the resulting process simulation data, process characterization data, in-process inspection data, post-build inspection data, or any combination thereof, into the training data set to improve a learned model that maps process control parameter values to process outcomes.

In general, the methods and systems for adaptive, real-time control of deposition processes that are disclosed herein do not rely on static data look-up operations (e.g., looking up process control parameters or process characterization data from previous runs). Rather, a machine learning algorithm is used to explore a range of input values for one or more process control parameters during process simulation and/or actual part fabrication, and generates a learned model that maps input process control parameters to process outcomes under a variety of different process and environmental conditions.

Machine Learning Algorithms for Adaptive Process Control:

As noted above, the machine learning algorithm(s) employed in the disclosed automated defect classification and additive manufacturing process control methods may comprise a supervised learning algorithm, an unsupervised learning algorithm, a semi-supervised learning algorithm, a reinforcement learning algorithm, a deep learning algorithm, or any combination thereof. Examples of machine learning algorithm that can be employed in automated defect classification and additive manufacturing process control methods are described in U.S. Pat. No. 10,921,782B2, the disclosure from which, including the relevant disclosure related to machine learning algorithms, is incorporated by reference herein in its entirety.

Deep learning algorithms: In the context of the present disclosure, deep learning algorithms are algorithms inspired by the structure and function of the human brain called artificial neural networks (ANNs), and specifically large neural networks comprising many layers, that are used to map object defect data to object classification decisions, or to map input additive manufacturing process control parameters to desired fabrication outcomes. Artificial neural networks will be discussed in more detail below.

Support vector machines (SVMs): In the context of the present disclosure, support vector machines are supervised learning algorithms used for classification and regression analysis of object defect classification date or additive manufacturing process control. Given a set of training data examples (e.g., object defect data), each marked as belonging to one or the other of two categories (e.g., good or bad, pass or fail), an SVM training algorithm builds a model that assigns new examples (e.g., defect data for a newly fabricated object) to one category or the other.

Autoencoders: In the context of the present disclosure, an autoencoder (also sometimes referred to as an autoassociator or Diabolo network) is an artificial neural network used for unsupervised, efficient mapping of input data, e.g., object defect data, to an output value, e.g., an object classification. Autoencoders are often used for the purpose of dimensionality reduction, i.e., the process of reducing the number of random variables under consideration by deducing a set of principal component variables. Dimensionality reduction may be performed, for example, for the purpose of feature selection (i.e., a subset of the original variables) or feature extraction (i.e., transformation of data in a high-dimensional space to a space of fewer dimensions).

Artificial neural networks (ANNs): In some cases, the machine learning algorithm used for the disclosed automated object defect classification or adaptive process control methods may comprise an artificial neural network (ANN), e.g., a deep machine learning algorithm. The automated object classification methods of the present disclosure may, for example, employ an artificial neural network to map object defect data to object classification data. The additive manufacturing process control systems of the present disclosure may, for example, employ an artificial neural network (ANN) to determine an optimal set or sequence of process control parameter settings for adaptive control of an additive manufacturing process in real-time based on a stream of process monitoring data and/or object defect classification data provided by one or more sensors. The artificial neural network may comprise any type of neural network model, such as a feedforward neural network, radial basis function network, recurrent neural network, or convolutional neural network, and the like. In some embodiments, the automated object defect classification and additive manufacturing process control methods and systems of the present disclosure may employ a pre-trained ANN architecture. In some embodiment, the automated object defect classification and additive manufacturing process control methods and systems of the present disclosure may employ an ANN architecture wherein the training data set is continuously updated with real-time object classification data or real-time deposition process control and monitoring data from a single local system, from a plurality of local systems, or from a plurality of geographically distributed systems.

Figure 10:
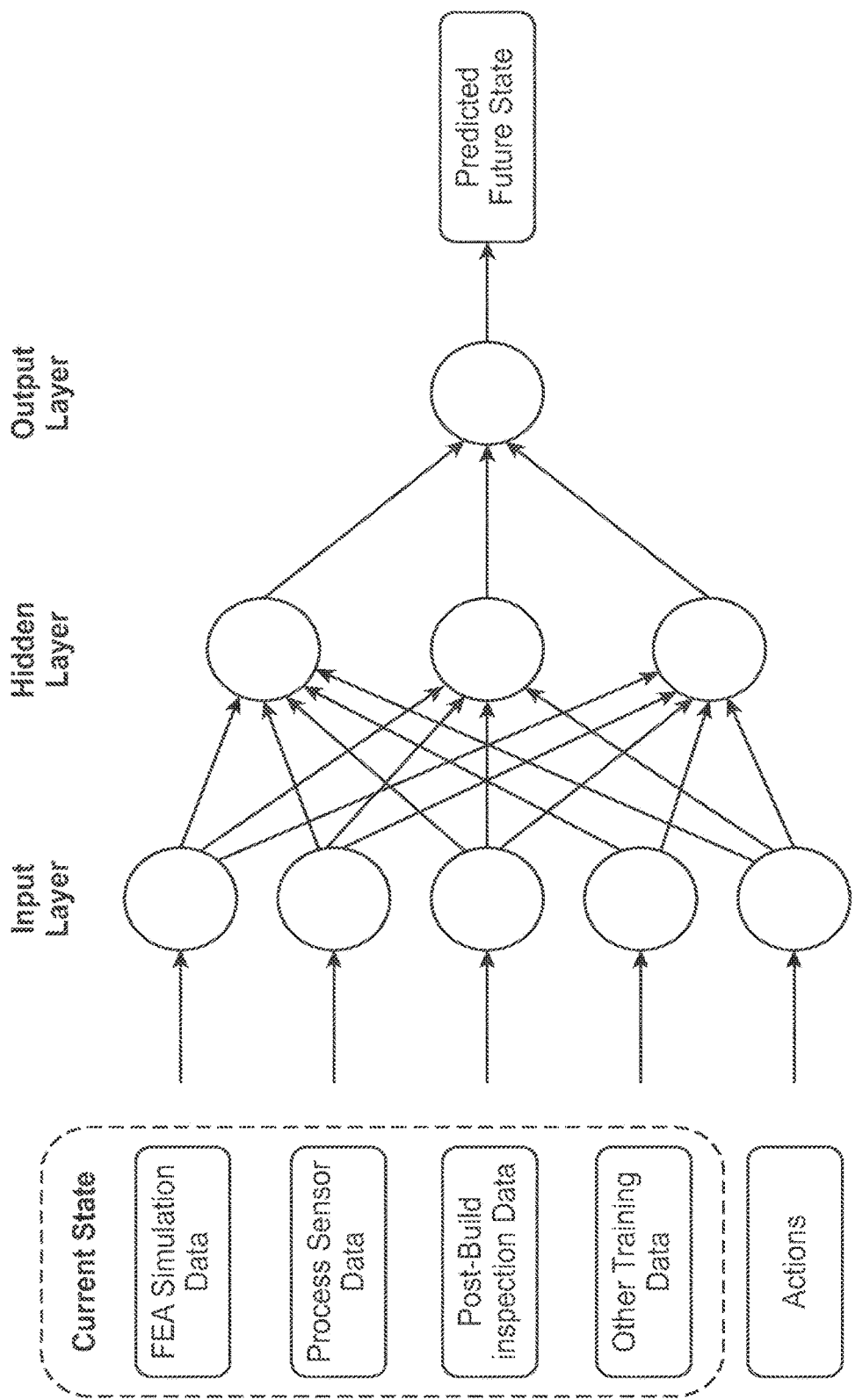
FIG. 10 provides a schematic illustration of an artificial neural network according to some embodiments of the present disclosure, and examples of the input(s) and output(s) of a neural network used to provide real-time, adaptive control of an additive manufacturing deposition process.
Figure 11:
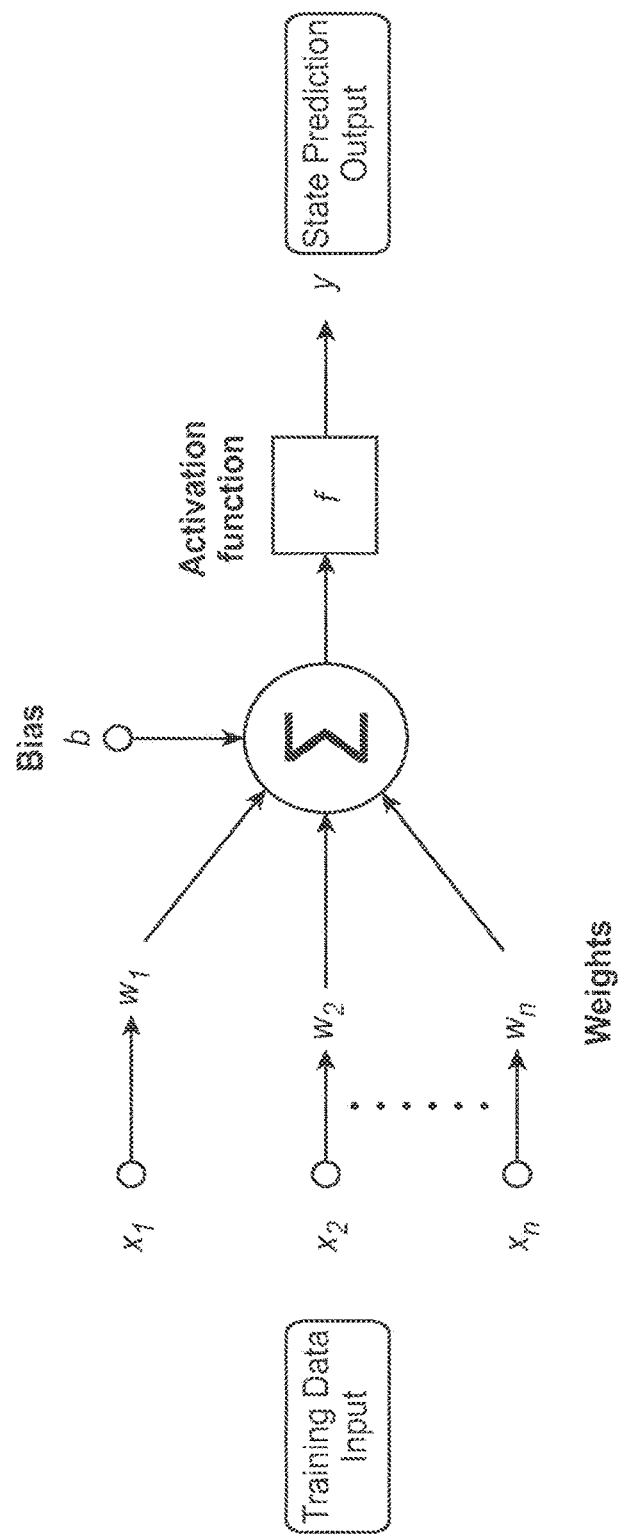
FIG. 11 provides a schematic illustration of the functionality of a node within a layer of an artificial neural network.

Artificial neural networks generally comprise an interconnected group of nodes organized into multiple layers of nodes (see FIG. 10). For example, the ANN architecture may comprise at least an input layer, one or more hidden layers, and an output layer. The ANN may comprise any total number of layers, and any number of hidden layers, where the hidden layers function as trainable feature extractors that allow mapping of a set of input data to a preferred output value or set of output values. Each layer of the neural network comprises a number of nodes (or neurons). A node receives input that comes either directly from the input data (e.g., sensor data, image data, object defect data, etc., in the case of the presently disclosed methods) or the output of nodes in previous layers, and performs a specific operation, e.g., a summation operation. In some cases, a connection from an input to a node is associated with a weight (or weighting factor). In some cases, the node may sum up the products of all pairs of inputs, $x_i$, and their associated weights, $w_i$ (FIG. 11). In some cases, the weighted sum is offset with a bias, b, as illustrated in FIG. 11. In some cases, the output of a neuron may be gated using a threshold or activation function, f, which may be a linear or non-linear function. The activation function may be, for example, a rectified linear unit (ReLU) activation function or other function such as a saturating hyperbolic tangent, identity, binary step, logistic, arcTan, softsign, parameteric rectified linear unit, exponential linear unit, softPlus, bent identity, softExponential, Sinusoid, Sinc, Gaussian, or sigmoid function, or any combination thereof.

The weighting factors, bias values, and threshold values, or other computational parameters of the neural network, can be "taught" or "learned" in a training phase using one or more sets of training data. For example, the parameters may be trained using the input data from a training data set and a gradient descent or backward propagation method so that the output value(s) (e.g., a set of predicted adjustments to process control parameter settings) that the ANN computes are consistent with the examples included in the training data set. The parameters may be obtained from a back propagation neural network training process that may or may not be performed using the same hardware as that used for automated object defect classification or adaptive, real-time deposition process control.

Other specific types of deep machine learning algorithms, e.g., convolutional neural networks (CNNs) (e.g., for the processing of image data from machine vision systems) may also be used by the disclosed methods and systems. CNN are commonly composed of layers of different types: convolution, pooling, upscaling, and fully-connected node layers. In some cases, an activation function such as rectified linear unit may be used in some of the layers. In a CNN architecture, there can be one or more layers for each type of operation performed. A CNN architecture may comprise any number of layers in total, and any number of layers for the different types of operations performed. The simplest convolutional neural network architecture starts with an input layer followed by a sequence of convolutional layers and pooling layers, and ends with fully-connected layers. Each convolution layer may comprise a plurality of parameters used for performing the convolution operations. Each convolution layer may also comprise one or more filters, which in turn may comprise one or more weighting factors or other adjustable parameters. In some instances, the parameters may include biases (i.e., parameters that permit the activation function to be shifted). In some cases, the convolutional layers are followed by a layer of ReLU activation function. Other activation functions can also be used, for example the saturating hyperbolic tangent, identity, binary step, logistic, arcTan, softsign, parameteric rectified linear unit, exponential linear unit, softPlus, bent identity, softExponential, Sinusoid, Sinc, Gaussian, the sigmoid function and various others. The convolutional, pooling and ReLU layers may function as learnable features extractors, while the fully connected layers may function as a machine learning classifier.

As with other artificial neural networks, the convolutional layers and fully-connected layers of CNN architectures typically include various computational parameters, e.g., weights, bias values, and threshold values, that are trained in a training phase as described above.

Figure 12:
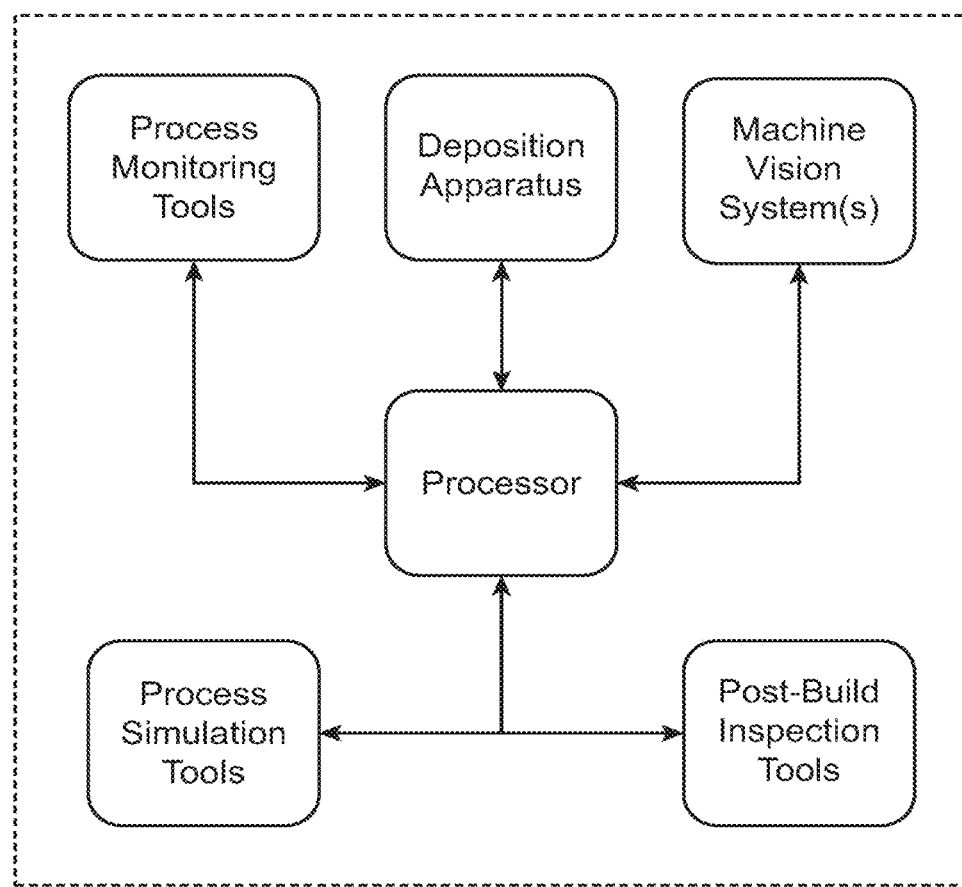
FIG. 12 provides a schematic illustration of an integrated system comprising an additive manufacturing deposition apparatus, machine vision systems and/or other process monitoring tools, process simulation tools, post-build inspection tools, and a processor for running a machine learning algorithm that utilizes data from the machine vision and/or process monitoring tools, the process simulation tools, the post-build inspection tools, or any combination thereof, to provide real-time adaptive control of the deposition process.

Integrated and Distributed Additive Manufacturing Systems:

In some embodiments, the adaptive, real-time process control methods of the present disclosure may be used for integrated additive manufacturing and/or welding systems (i.e., free form deposition or joining systems) that reside at a single physical/geographical location. FIG. 12 provides a schematic illustration of an integrated additive manufacturing system comprising a deposition apparatus, one or more machine vision systems and/or other process monitoring tools, process simulation tools, post-build inspection tools, and one or more processors for running a machine learning algorithm that utilizes data from the process simulation tools, machine vision and/or process monitoring tools (including in-process inspection and/or defect classification tools), post-build inspection tools, or any combination thereof, to provide real-time adaptive control of the deposition process, where the components of the system are located in the same physical/geographical location. In these embodiments, the processor may communicate with the individual system components through direct, hard-wired connections and/or via short-range communication links such as Bluetooth or Wi-Fi connections. In some embodiments, two or more of the system components may be housed within an enclosure or housing (dashed line) that enables tighter control of fabrication environmental parameters such as temperature, pressure, atmospheric composition, etc.

Figure 13:
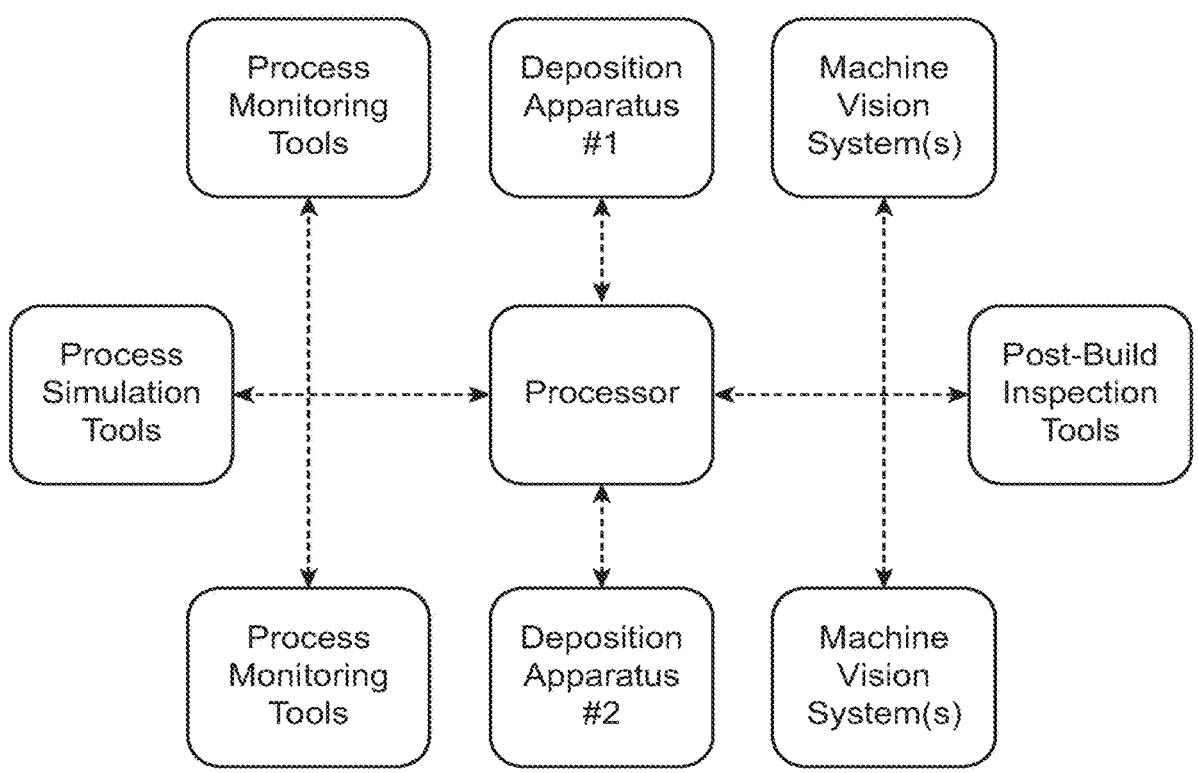
FIG. 13 provides a schematic illustration of a distributed system comprising an additive manufacturing deposition apparatus, machine vision systems and/or other process monitoring tools, process simulation tools, post-build inspection tools, and a processor for running a machine learning algorithm that utilizes data from the machine vision and/or process monitoring tools, the process simulation tools, the post-build inspection tools, or any combination thereof, to provide real-time adaptive control of the deposition process. In some embodiments, the different components or modules of the system may be physically located in different workspaces and/or worksites, and may be linked via a local area network (LAN), an intranet, an extranet, or the internet so that process data (e.g., training data, process simulation data. process control data, and post-build inspection data) and process control instructions may be shared and exchanged between the different modules.

FIG. 13 provides a schematic illustration of a distributed free form deposition system, e.g., an additive manufacturing system, comprising one or more deposition apparatus, process simulation tools, machine vision systems and/or other process monitoring tools, in-process inspection tools, post-build inspection tools, and one or more processors for running a machine learning algorithm that utilizes data from the machine vision and/or process monitoring tools, the process simulation tools, the post-build inspection tools, or any combination thereof, to provide real-time adaptive control of the deposition process, where the different components or modules of the system may be physically located in different workspaces and/or worksites (i.e. different physical/geographical locations), and may be linked via a local area network (LAN), an intranet, an extranet, or the internet so that process data (e.g., training data, process simulation data, process control data, in-process inspection data, and/or post-build inspection data) and process control instructions may be shared and exchanged between the different modules. In some embodiments, some of the co-localized system components (e.g., a deposition apparatus and a process monitoring tool) may be housed within a local enclosure or housing (not shown) that enables tighter control of fabrication environmental parameters such as temperature, pressure, atmospheric composition, etc.

Figure 14:
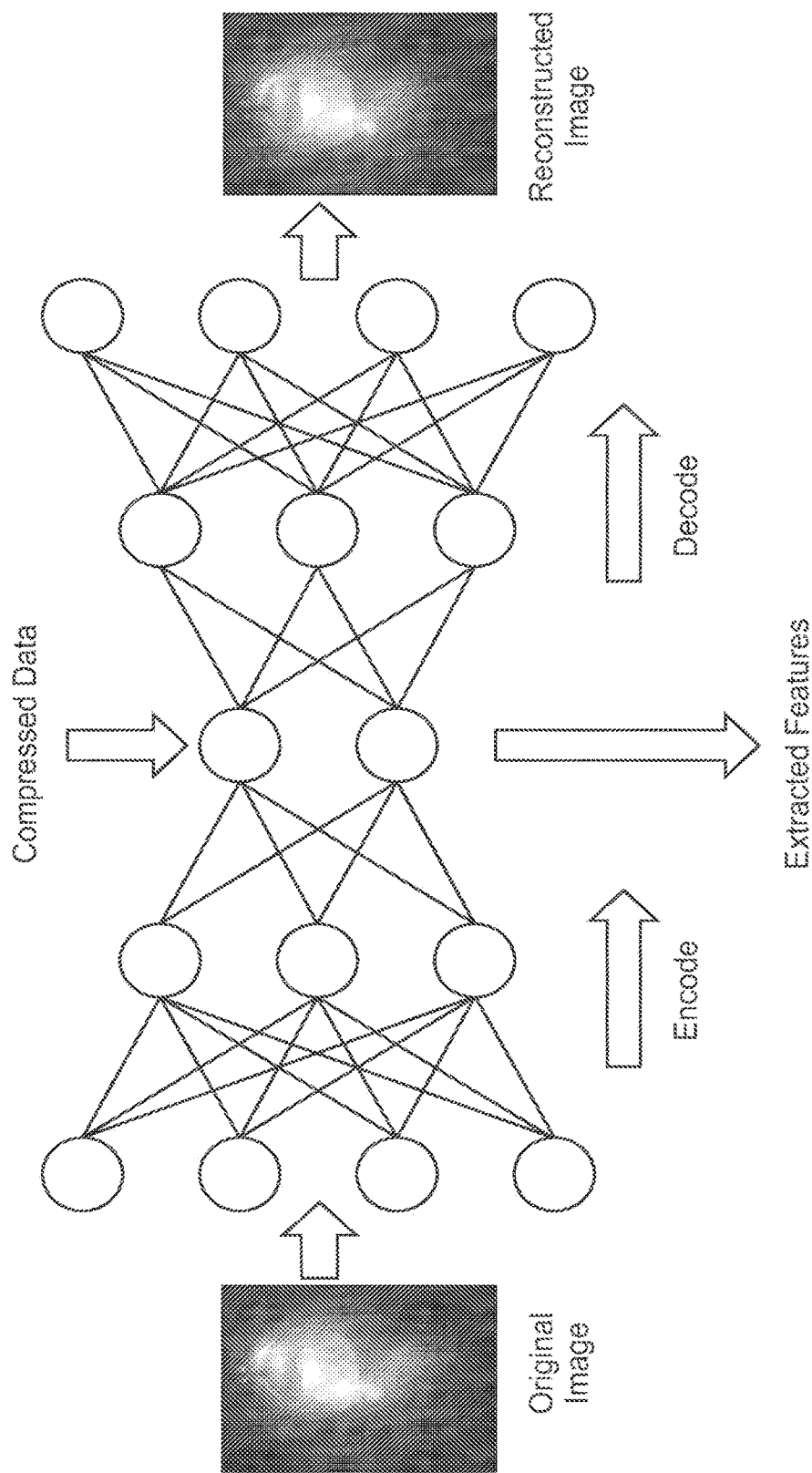
FIG. 14 illustrates one non-limiting example of an unsupervised feature extraction and data compression process.

For distributed systems, the sharing of data between one or more deposition apparatus, one or more process monitoring sensors, machine vision systems, and/or in-process inspection tools may be facilitated through the use of a data compression algorithm, a data feature extraction algorithm, or a data dimensionality reduction algorithm. FIG. 14 illustrates one non-limiting example of an unsupervised ANN-based approach to image feature extraction and data compression, whereby image data is conveniently compressed, transmitted, and reconstructed at a different physical/geographical location from that at which it was acquired.

Processors & Computer Systems:

One or more processors may be employed to implement the machine learning algorithms, automated object defect classification methods, and additive manufacturing process control methods disclosed herein. The one or more processors may comprise a hardware processor such as a central processing unit (CPU), a graphic processing unit (GPU), a general-purpose processing unit, or computing platform. The one or more processors may be comprised of any of a variety of suitable integrated circuits, microprocessors, logic devices and the like The one or more processors, or the automated additive manufacturing deposition apparatus and control system itself, may be part of a larger computer system and/or may be operatively coupled to a computer network (a "network") with the aid of a communication interface to facilitate transmission of and sharing of data and predictive results. The network may be a local area network, an intranet and/or extranet, an intranet and/or extranet that is in communication with the Internet, or the Internet. The network in some cases is a telecommunication and/or data network. The network may include one or more computer servers, which in some cases enables distributed computing, such as cloud computing. The network, in some cases with the aid of the computer system, may implement a peer-to-peer network, which may enable devices coupled to the computer system to behave as a client or a server.

The computer system may also include memory or memory locations (e.g., random-access memory, read-only memory, flash memory), electronic storage units (e.g., hard disks), communication interfaces (e.g., network adapters) for communicating with one or more other systems, and peripheral devices, such as cache, other memory, data storage and/or electronic display adapters. The memory, storage units, interfaces and peripheral devices may be in communication with the one or more processors, e.g., a CPU, through a communication bus, e.g., as is found on a motherboard. The storage unit(s) may be data storage unit(s) (or data repositories) for storing data. Examples of computer systems and associated components are described in U.S. Pat. No. 10,921,782B2, the disclosure from which, including the relevant disclosure related to computer systems and components thereof, is incorporated by reference herein in its entirety.

The computer system typically includes, or may be in communication with, an electronic display for providing, for example, images captured by a machine vision system.

EXAMPLES

These examples are provided for illustrative purposes only and not intended to limit the scope of the claims provided herein.

Prophetic Example 1Automated Object Defect Classification

The machine learning algorithm-based automated object defect classification methods and systems disclosed herein provide a key component for enabling adaptive, real-time additive manufacturing (or welding) process control. The methods comprise the use of a machine learning algorithm to analyze in-process or post-build inspection data for the purpose of identifying object defects and classifying them according to a specified set of fabrication quality criteria, and in some embodiments, further provide input data for real-time adaptive process control.

Figure 15:
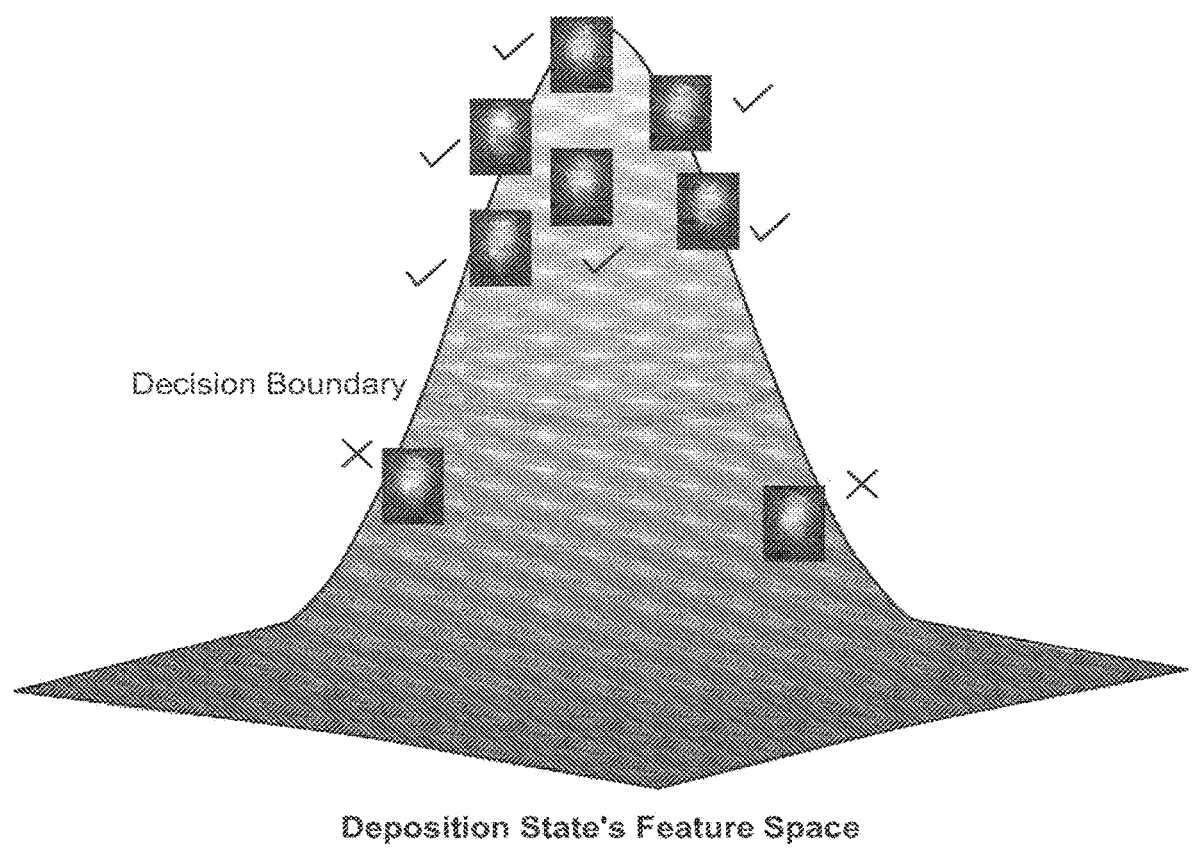
FIG. 15 illustrates the expected outcome for one non-limiting example of an unsupervised machine learning process for classification of object defects.

FIG. 15 provides a schematic illustration of the expected outcome for an unsupervised machine learning process for classification of object defects. One or more automated inspection tools, e.g., machine vision systems coupled with automated image processing algorithms, are used to monitor and measure feature dimensions, angles, surface finishes, and/or other properties of fabricated parts both in-process and post-build. Defects may be identified, e.g., by removing noise from the inspection data and subtracting a reference data set (e.g., a reference image of a defect-free part in the case that machine vision tools are being utilized for inspection), and classified using an unsupervised machine learning algorithm such as cluster analysis or an artificial neural network, to classify individual objects as either meeting or failing to meet a specified set of decision criteria (e.g., a decision boundary) in the feature space in which defects are being monitored. Tracking of the process control parameters and process monitoring data that were used to fabricate a set of objects (including both those that met the decision criteria and those that did not) provides training data for the machine learning algorithm used to run fabrication process control.

Prophetic Example 2Adaptive, Real-Time Additive Manufacturing Process Control

FIG. 10 shows one non-limiting example of an ANN architecture used for real-time, adaptive process control of an additive manufacturing (or welding) process. In FIG. 10, the input layer comprises one or more real-time streams of process and/or object property data that provide an indication of the current state of the fabrication process and/or the part being fabricated. Examples of suitable input data streams include, but are not limited to, process simulation data (e.g., FEA simulation data), process monitoring or characterization data, in-process inspection data, post-build inspection data, or any combination thereof, as well as a list of process control parameters that may be adjusted to implement next step actions to achieve a target (or future) fabrication state. This data is fed to the ANN, which in many cases has been previously trained using one or more training data sets comprising process simulation data, process monitoring or characterization data, in-process inspection data, post-build inspection data, or any combination thereof, from previous fabrication runs of the same or different types of parts. The hidden or intermediate layers of the ANN act as trained feature extractors, while the output layer in the example of FIG. 10 provides a determination of a predicted future build state. As noted above, the ANN model is trained to predict future build state based on current build state and a set of actions. Once the ANN model has been developed (i.e., the model can map current state and process parameters to a future state) its use can be extended to the determination of a set of process control parameter adjustments for the next N states. The ANN model is a first step in creating an action-value function, and determining the next sequence of actions for a given build step (as depicted in FIG. 8) is a second step in developing adaptive, real-time process control.

In some embodiments, a neural network model may be used directly to determine adjustments to process control parameters. This will typically involve a more difficult "training" or "learning" process. Initially, the machine is allowed to choose randomly from a range of values for each input process control parameter or action. If the sequence of process control parameter adjustments or actions leads to a flaw or defect, it is scored as leading to an undesirable (or negative) outcome. Repetition of the process using different sets of randomly chosen values for each process control parameter or action leads to reinforcement of those sequences that least to desirable (or positive) outcomes. Ultimately, the neural network model "learns" what adjustments to make to a set or sequence of deposition process control parameters or actions in order to achieve the target outcome, i.e., a defect-free printed part.

Figure 16A:
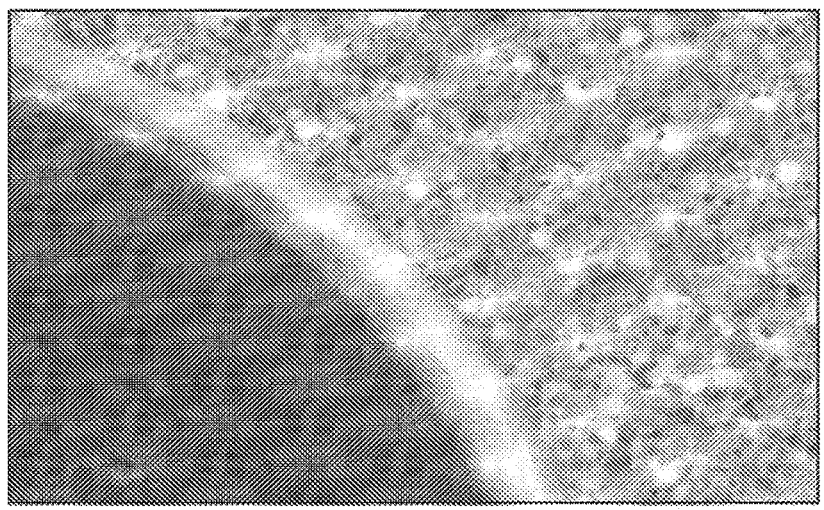
FIGS. 16A-C provide an example of post-process image feature extraction and correlation with build-time actions.
Figure 16B:
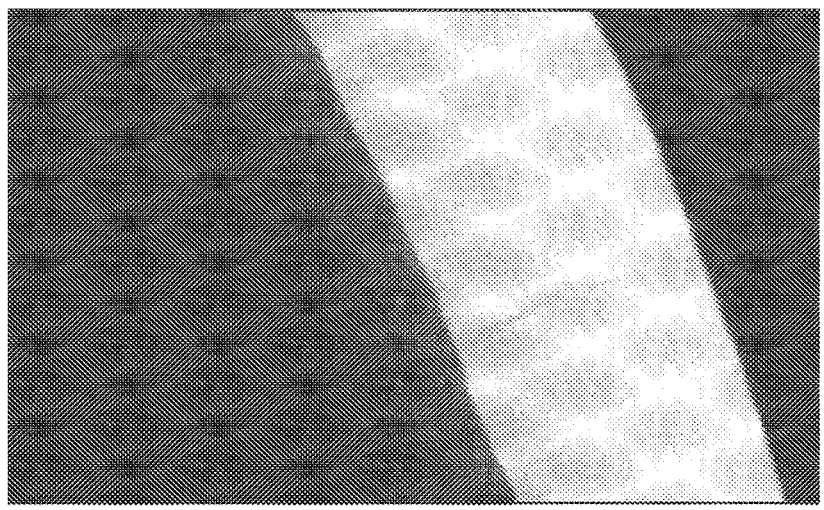
Figure 16C:
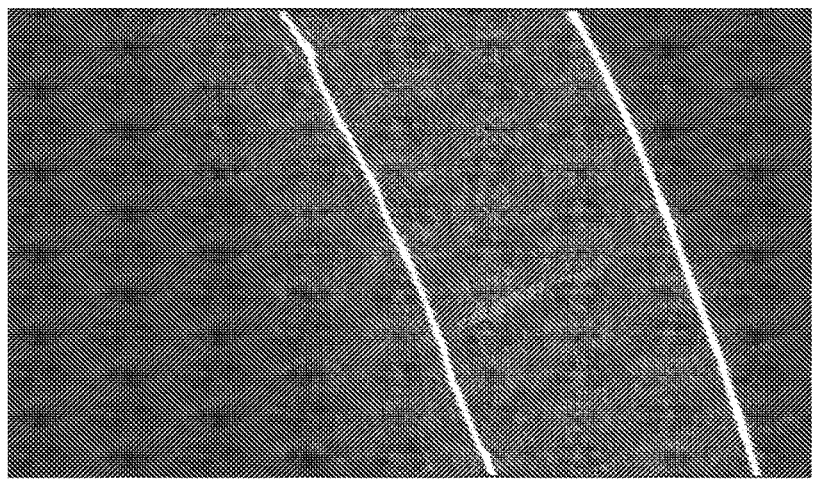

Example 3Post-Process Image Feature Extraction and Correlation with Build-Time Actions FIGS. 16A-C provide an example of in-process and post-process image feature extraction and correlation of part features with build-time actions. FIG. 16A: image of the part after the build process has been completed. FIG. 16B: example of post-build inspection output (in this case, a computerized tomography (CT) scan of the part). FIG. 16C: image obtained using a feature extraction algorithm to process the CT scan shown in FIG. 16B. In some embodiments, automated feature extraction allows one to correlate part features with build-time actions. During the build (e.g., when printing), in addition to building a machine learning model that correlates process control parameters (e.g., laser power, feed rate, travel speed, etc.) and result of the deposition process (e.g., the shape of melt pool, defects in the melt pool, etc.), one may also create a mapping between the process control parameters and a specific location in the part. This allows one to subsequently index post-build inspection data on the part and correlate findings from post-build inspection with process control parameters that are specific to a region of interest, thereby expanding the machine learning model to include post-build inspection data.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in any combination in practicing the invention. It is intended that the following claims define the scope of the invention and that methods and structures within the scope of these claims and their equivalents be covered thereby.

What is claimed is:

1. An additive manufacturing system, the system comprising:
a robotic additive manufacturing deposition system capable of performing a deposition process using instructions, and the robotic additive manufacturing deposition system comprising a sensor capable of generating sensor data; and
one or more processors, wherein the one or more processors are configured to:
receive a toolpath, the toolpath capable of being utilized to fabricate an object using the deposition process;
receive sensor data from the sensor, wherein the sensor data is provided as an input to a classifier, wherein:
the classifier comprises a set of parameters; and
the classifier is capable of outputting a real-time classification of detected object defects based upon the input to the classifier and the set of parameters;
generate instructions for performing an additive manufacturing process to fabricate the object, wherein the instructions are based on the real-time classification of detected object defects; and
control the robotic additive manufacturing deposition system based on the generated instructions to fabricate the object using the deposition process.

2. The additive manufacturing system of claim 1, wherein the sensor data is real-time sensor data.

3. The additive manufacturing system of claim 1, wherein the sensor data is generated based on observation of a deposition site, wherein the deposition site is a location at which the robotic additive manufacturing deposition system is depositing material.

4. The additive manufacturing system of claim 1, wherein the sensor data comprises one or more object properties of the object.

5. The additive manufacturing system of claim 1, wherein the one or more processors are further configured to perform a noise removal technique to the sensor data before the sensor data is provided as an input to the classifier.

6. The additive manufacturing system of claim 1, wherein the classifier is characterized in that the set of parameters were determined using a machine learning method.

7. The additive manufacturing system of claim 6, wherein the machine learning method is a convolutional neural network.

8. The additive manufacturing system of claim 1, wherein the instructions are generated based on a predicted set of process control parameters.

9. The additive manufacturing system of claim 8, wherein the predicted set of process control parameters are adjusted in real-time based on one or more outputs from the classifier.

10. The additive manufacturing system of claim 1, wherein the classifier further comprises activation functions.

11. The additive manufacturing system of claim 8, wherein the predicted set of process control parameters were determined based on an output of a second classifier, wherein the second classifier comprises a second set of parameters, and wherein the second set of parameters of the second classifier were determined using a machine learning process based on training data generated through a repetitive process of randomly choosing values for each of at least one of process control parameter adjustments and scoring adjustments to the process control parameters as leading to either undesirable or desirable outcomes, the desirability of outcomes determined based respectively on a presence or absence of defects detected in a fabricated object arising from the process control parameter adjustments.

12. The additive manufacturing system of claim 1, wherein the set of parameters of the classifier were determined using a machine learning process based upon training data comprising past process simulation data, past process characterization data, past in-process inspection data, and past post-build inspection data, for a plurality of objects that comprise at least one second object that is different from the first object.

13. The additive manufacturing system of claim 1, wherein the set of parameters of the classifier were determined using a machine leaning process based on training data, the training data comprising past sensor data generated for at least one past object, the at least one past object different from the first object.

14. An additive manufacturing system, the system comprising:
a robotic additive manufacturing deposition system capable of performing a deposition process using instructions, and the robotic additive manufacturing deposition system comprising a sensor capable of generating sensor data; and
one or more processors, wherein the one or more processors are configured to:
receive a toolpath, the toolpath capable of being utilized to fabricate an object using the deposition process;
receive sensor data from the sensor, wherein the sensor data is provided as an input to a model, wherein:
the model comprises a set of model parameters; and
the model is capable of outputting a real-time set of process parameters based upon the input to the model and the set of model parameters;
generate a predicted set of process control parameters using the model;
generate instructions for performing an additive manufacturing process to fabricate the object, wherein the instructions are based on at least the set of process control parameters; and
control the robotic additive manufacturing deposition system based on the generated instructions to fabricate the object using the deposition process.

15. The additive manufacturing system of claim 14, wherein the sensor data is real-time sensor data.

16. The additive manufacturing system of claim 14, wherein the model is characterized in that the model parameters were determined using a machine learning method.

17. The additive manufacturing system of claim 16, wherein the machine learning method is a support vector machine.

18. The additive manufacturing system of claim 14, wherein the model further comprises activation functions.

19. The additive manufacturing system of claim 14, wherein the set of model parameters were determined using a machine learning process based on training data generated through a repetitive process of randomly choosing values for each of at least one of process control parameters adjustments and scoring adjustments to the process control parameters as leading to either undesirable or desirable outcomes, the desirability of outcomes determined based respectively on a presence or absence of defects detected in a fabricated object arising from the process control parameter adjustments.

20. The additive manufacturing system of claim 14, wherein a set of classifier parameters of a classifier were determined using a machine learning process based upon training data comprising past process simulation data, past process characterization data, past in-process inspection data, and past post-build inspection data, for a plurality of objects that comprise at least one second object that is different from the first object and wherein the classifier is capable of outputting a real-time classification of detected object defects based upon an input to the classifier and the set of classifier parameters.

21. The additive manufacturing system of claim 14, wherein the set of model parameters of the model were determined using a machine learning process based on training data, the training data comprising past sensor data generated for at least one past object, the at least one past object different from the first object.

* * * * *